(12) United States Patent
Motoyoshi

(10) Patent No.: US 7,990,580 B2
(45) Date of Patent: Aug. 2, 2011

(54) DOCUMENT SCANNING APPARATUS

(75) Inventor: Kouichi Motoyoshi, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 658 days.

(21) Appl. No.: 12/052,588

(22) Filed: Mar. 20, 2008

(65) Prior Publication Data

US 2008/0231914 A1 Sep. 25, 2008

(30) Foreign Application Priority Data

Mar. 22, 2007 (JP) .................. 2007-075098

(51) Int. Cl.
H04N 1/04 (2006.01)

(52) U.S. Cl. ...... 358/403; 358/1.13; 358/1.15; 358/1.16

(58) Field of Classification Search .................. 358/403, 358/1.13, 1.15, 1.16
See application file for complete search history.

(56) References Cited

U.S. PATENT DOCUMENTS

| | | | |
|---|---|---|---|
| 5,745,112 A | 4/1998 | Hirose | |
| 6,285,842 B1 | 9/2001 | Katamoto et al. | |
| 7,161,697 B2 * | 1/2007 | Yajima | 358/1.15 |
| 7,602,511 B2 * | 10/2009 | Kojima et al. | 358/1.15 |
| 2003/0086720 A1 | 5/2003 | Song | |
| 2005/0276519 A1 | 12/2005 | Kitora et al. | |
| 2006/0053370 A1 | 3/2006 | Hitaka et al. | |
| 2007/0019227 A1 | 1/2007 | Hibino et al. | |
| 2007/0035564 A1 | 2/2007 | Katsuyama | |
| 2007/0058226 A1 | 3/2007 | Lu et al. | |

FOREIGN PATENT DOCUMENTS

| | | |
|---|---|---|
| EP | 0717342 A1 | 6/1996 |
| EP | 1605348 A2 | 12/2005 |
| EP | 1633125 A1 | 3/2006 |
| EP | 1764995 A2 | 3/2007 |
| JP | 11252326 A | 9/1999 |
| JP | 11-316821 | 11/1999 |
| JP | 2003-241931 | 8/2003 |
| JP | 2003-244372 | 8/2003 |
| JP | 2004172874 A | 6/2004 |
| JP | 2005269524 A | 9/2005 |
| JP | 2006-254106 | 9/2006 |
| JP | 2006331230 A | 12/2006 |
| JP | 2007028508 A | 2/2007 |
| JP | 2007041727 A | 2/2007 |

OTHER PUBLICATIONS

European Search Report for corresponding European application 08002216.3-2202 lists the references above, Dated May 12, 2008.
Japanese language office action and its English language translation for corresponding Japanese application 2007075098 lists the references above, Dated Jan. 28, 2009.

* cited by examiner

Primary Examiner — Houshang Safaipour
(74) Attorney, Agent, or Firm — DLA Piper LLP (US)

(57) ABSTRACT

Scanned images are tiled in a list display area of a display of a touch panel. A model icon and other icons for editing are displayed in an edit icon display area. A scanned image is accepted as an object to be processed by a touch operation to the scanned image. By moving the touched position to the model icon and releasing the touch, an editing process by the model icon is accepted. The model icon is displayed with the scanned image overlapped thereon as the result of the editing process.

18 Claims, 17 Drawing Sheets

FIG. 2
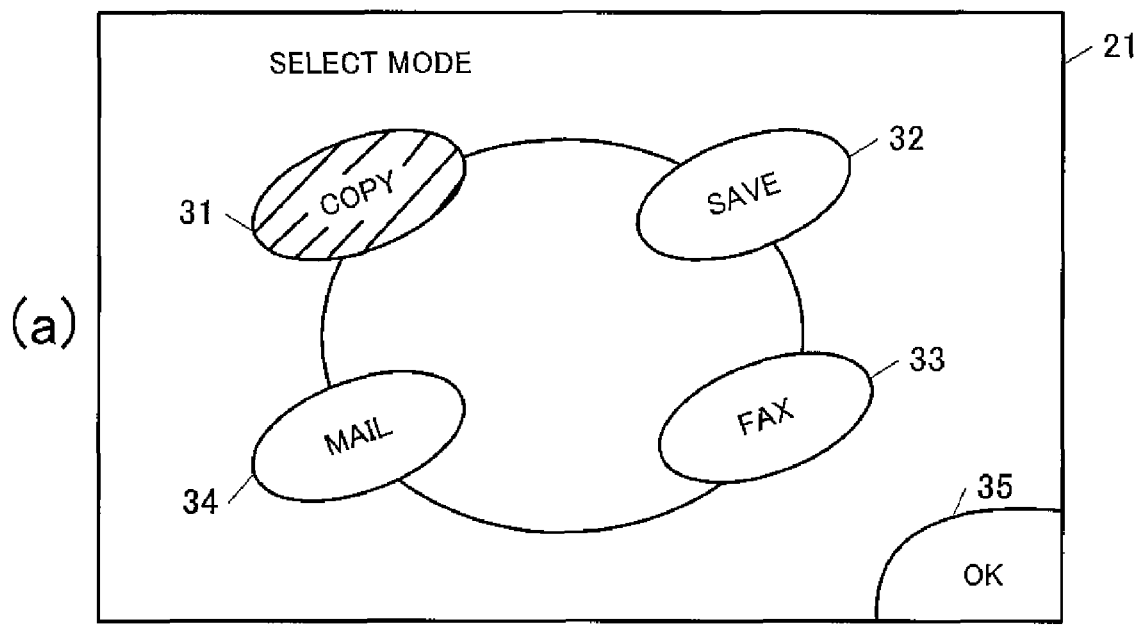
(a)
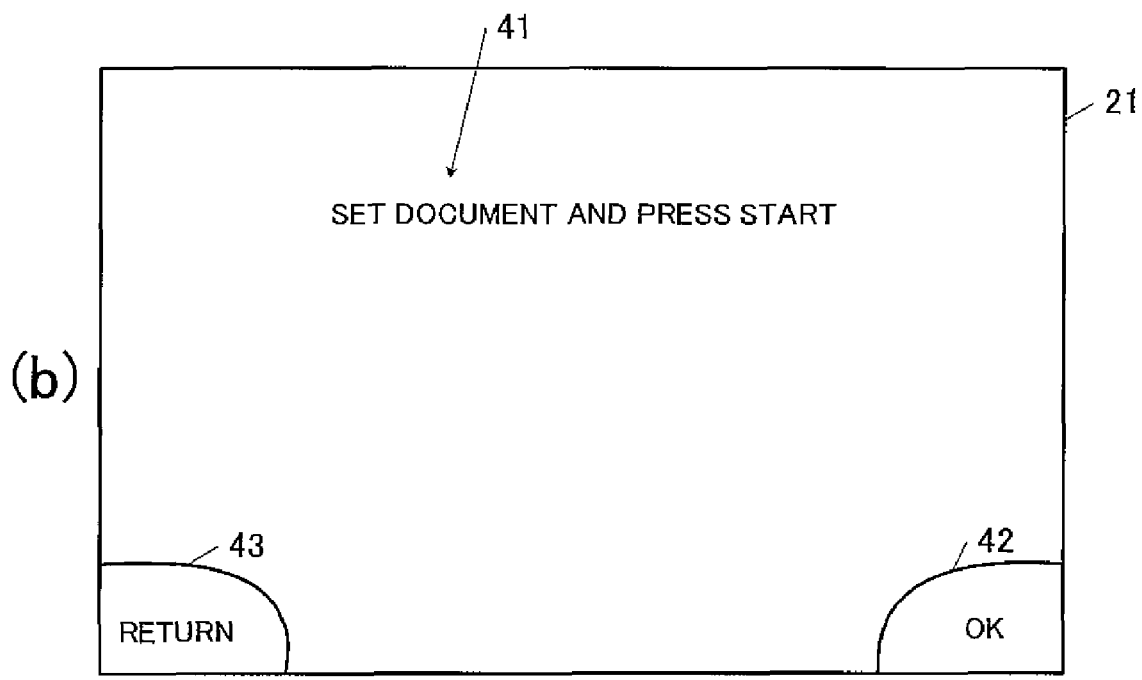
(b)

DOCUMENT SCANNING APPARATUS

CROSS-REFERENCE TO RELATED APPLICATIONS

This application claims priority under 35 U.S.C 119 to Japanese Patent Application No. 2007-75098, filed on Mar. 22, 2007, which application is hereby incorporated by reference in its entirety.

BACKGROUND OF THE PRESENT INVENTION

1. Field of the Present Invention

The present invention relates to document scanning apparatuses that scan documents and acquire images, such as copying machines, scanners or facsimile machines.

2. Description of the Related Art

In the related art, document scanning apparatuses such as copying machines, facsimile machines, scanners or digital multifunction peripherals are widely used to scan documents with an optical unit having a Charge Coupled Devices (CCD) image sensor and to carry out various processing on acquired images. For example, a copying machine prints a scanned document on printing paper, a facsimile machine transmits a scanned document to other machines, and a scanner stores a scanned document in a storage device. A digital multifunction peripheral (MFP) has the functions of all of these machines.

An Automatic Document Feed (ADF) may be mounted on the document scanning apparatus. The user can cause the apparatus to scan a plurality of documents with a single operation using the ADF. Functions included in the document scanning function increase every year. For example, copying machines have various functions such as an aggregating function for copying a plurality of pages of documents onto a piece of printing paper, a duplex copying function for copying a document on both sides of a printing paper, compression and expansion functions for copying a document in a compressed or expanded scale, and so on. With these functions, the user is able to make copies in various modes such as scanning a number of documents at once and aggregating the scanned pages in duplex copies.

However, unlike Personal Computers (PCs), advanced input devices such as a keyboard and a mouse are typically not provided in the document scanning apparatus. Therefore, a process to be carried out on an image acquired by scanning a document is selected from menu items displayed on a liquid crystal display unit through a small number of buttons, a touch panel or the like. For example, when copying a plurality of documents in an aggregated manner, the user selects aggregated printing from the menu, sets the documents on the ADF, and operates a start button to start copying. The copying machine scans the documents, aggregates the acquired images according to the setting of the aggregated printing, and prints out the images on the printing paper. Then, the user confirms that the process is finished by referring to the printed documents outputted from the machine. However, when the process is not satisfactorily carried out, the same sequence must be repeated, causing problems of wasted time and wasted resources such as printing papers. In this manner, the user is obliged to use various functions with the input device having low operability such as the small number of buttons or the touch panel, and hence erroneous operations may increase with the increase of the functions of the document scanning apparatus, whereby these problems might become more striking.

JP-A-2003-244372 proposes an image forming apparatus that reduces the probability of miscopying by providing a function to display in preview mode an output layout of the plurality of documents or the duplex copying mode or the like before output. A preview processing unit edits an image acquired by scanning a document or an image stored in a memory unit and displays the image on a monitor. For example, a layout of the duplex copy or a layout of the image formed on the front and back surfaces of a recording medium or the like is displayed.

JP-A-2006-254106 proposes a copy control apparatus that provides a copy with desired finish even when an area that cannot be reproduced by a printing device is included in an image to be copied. This copy control apparatus transfers an image data for simulation, which is obtained by reducing the resolution of an image data to be printed acquired by scanning an original to be copied, to a client PC, and displays the simulation image on the client PC. The copy control apparatus then determines the presence or absence of an irreproducible area having a color difference exceeding a threshold value from the original image based on the image data for simulation, and expressly presents it on the simulation image. When the user expresses an intention to change the printing conditions, the simulation image is displayed again under the changed printing conditions. When the user specifies the printing conditions to be fixed, the copy control apparatus transmits the fixed printing conditions to the MFP, so that the MFP carries out printing on the printing paper under the fixed printing conditions.

In the image forming apparatus of JP-A-2003-244372, since the user is able to confirm by displayed preview image the output result before printing on the printing paper, waste of resources such as printing paper due to miscopying can be reduced. However, since there is no specific considerations and improvement in the operating method and operating sequence and the like, the user is obliged to change the selection or setting of the function or to try the operation again through a complicated operation when the output result displayed as a preview is not satisfactory. In particular, when a plurality of the functions are used, for example, when aggregating the documents for printing on both sides of the printing paper, it is difficult to determine which function is to be reset even when the output result displayed as a preview is not satisfactory. Therefore, the problem of increased working time of the user is not solved fundamentally.

The copy control apparatus of JP-A-2006-254106 transmits image data for simulation to a client PC so that the user can display the simulation image and change the printing conditions. Therefore, a complicated operation can be achieved using the keyboard and mouse of the client PC. However, a client PC is required in addition to the printing apparatus, and hence costs are increased. A digital MFP in recent years typically has a function to connect to a network. However, there is a problem that the user must move between the digital MFP and the client PC when the digital MFP and the client PC that is connected to the network are not arranged in proximity, which is troublesome for the user.

SUMMARY OF THE PRESENT INVENTION

In order to overcome the problems described above, the present invention provides a document scanning apparatus in which the user is able to simultaneously and easily achieve confirmation of scanned images acquired by scanning, selection of a process to be carried out for the respective scanned images and confirmation of the processed result through a touch panel. Therefore, the present invention provides a document scanning apparatus that displays scanned images and images to be processed on a touch-panel display, accepts a touched scanned image as an object to be processed, accepts a touched process relating to the image to be processed as a process to be carried out for the object to be processed, and displays the result of processing together with the scanned image and the image to be processed.

The present invention provides a document scanning apparatus in which editing of scanned images is easy, and confirmation of the editing result is ensured.

The present invention provides a document scanning apparatus in which specification of destinations is easy.

The present invention provides a document scanning apparatus in which specification of locations to save is easy.

The present invention provides a document scanning apparatus in which the user is able to confirm detailed information on scanned images with ease.

According to a first aspect of the present invention, a document scanning apparatus is provided having a document scanner for scanning at least one page of a document and acquiring a scanned image for each page, and a touch panel having a display for displaying an image and a sensor for sensing a touch operation to the image displayed on the display. A displaying processing unit displays at least one scanned image and an image to be processed associated with a process to be carried out for the scanned image on the display of the touch panel. An object-to-be-processed accepting unit accepts the scanned image as an object to be processed when the sensor senses the touch operation to the scanned image displayed on the display. A process accepting unit accepts a process associated with the image to be processed as a process to be carried out for the object to be processed when the sensor senses the touch operation to the image to be processed displayed on the display after the object-to-be-processed accepting unit has accepted the object to be processed. A scanned image processing unit carries out the process accepted by the process accepting unit for the scanned image to be processed that is accepted by the object-to-be-processed accepting unit. The display processing unit displays a processed result carried out by the scanned image processing unit on the display together with the scanned image or the image to be processed.

In the present invention, the scanned image acquired by scanning the document and the image to be processed associated with the process to be carried out are displayed on the display of the touch panel provided on the document scanning apparatus. When the documents are a plurality of pages, the acquired plurality of scanned images may be displayed in a list in a matrix pattern or in an overlapped state. When the displayed scanned image is touched, the scanned image is accepted as an object to be processed. A process relating to the image to be processed that is touched is accepted as a process to be carried out for the object to be processed. For example, the object to be processed and the process to be carried out may be selected by touching the scanned image, and dragging and dropping the scanned image on the image to be processed. The object to be processed and the process to be carried out may also be selected by alternately touching the scanned image and the image to be processed. By touching the scanned image and the image to be processed displayed on the display, the object to be processed and the process to be carried out therefor are selected, and the scanned image and the image to be processed displayed on the same screen are selected in correspondence. Furthermore, the result of execution of the accepted process to the scanned image to be processed is displayed together with the scanned image and the image to be processed displayed on the display. Accordingly, the user is able to select the object to be processed and the process while confirming the result of the process.

In a document scanning apparatus according to a second aspect of the present invention, the display processing unit displays a model image associated with an editing process to be carried out for the scanned image on the display as the image to be processed. The scanned image processing unit carries out the editing process on the basis of the model image accepted by the process accepting unit for the scanned image to be processed accepted by the object-to-be-processed accepting unit. The display processing unit displays the result of combining the scanned image as the object to be processed with the model image.

In the present invention, the model image associated with the editing process is displayed as the image to be processed. For example, by displaying a square frame divided into halves or quarters as the model image for an aggregating function and selecting scanned images and parts of the divided square frame in correspondence, the user is able to edit the layout of the aggregated plural scanned images. Also, by displaying images of two square frames allocated to the front face and the back face of the printing paper as model images for the duplex printing function and selecting the scanned image and one of the frames in correspondence, the user is able to edit the allocation of scanned images to the front and back faces of the printing paper and the orientations thereof and the like. Furthermore, by displaying the result of editing in combination with the model, the user is able to carry out editing work while confirming the edited result.

The document scanning apparatus according to a third aspect of the present invention includes a transmitter that transmits the scanned image to another apparatus provided separately. The display processing unit displays a destination image associated with a destination to be transmitted by the transmitter as the image to be processed, and the scanned image processing unit transmits the scanned image to be processed which is accepted by the object-to-be-processed accepting unit to the destination allocated to the destination image accepted by the process accepting unit.

In the present invention, when the document scanning apparatus has a function to transmit a scanned image acquired by scanning a document to another apparatus by facsimile communication, mail transmission or the like, the destination image in association with the destination is displayed as the image to be processed. For example, a plurality of icons having appellations of the destinations may be displayed and a destination icon selected for the respective scanned images for transmission. The processed result may be displayed by overlapping the appellation of the specified destination on the corresponding scanned image.

A document scanning apparatus according to a fourth aspect of the present invention includes a saving processing unit for saving the scanned image in a storage device. The display processing unit displays a location-to-save icon associated with a location to save by the saving processing unit on the display as the image to be processed. The scanned image processing unit saves the scanned image to be processed which is accepted by the object-to-be-processed accepting unit to the location to save allocated to the location-to-save image which is accepted by the process accepting unit.

In the present invention, the document scanning apparatus includes a function to save the scanned image acquired by scanning the document to the storage device, that is, a so-called scanner function. A portable memory may be mounted to the document scanning apparatus for saving the scanned image, the scanned image may be saved in a memory or a hard disk integrated in the document scanning apparatus, and the scanned image may be saved in a file sever via a network. In such cases, a storage device is selected for saving the scanned image and a folder is specified as a location to save. Therefore, for example, a plurality of icons having the device name or the folder name as the location to save shown thereon may be tiled so that the icons of the location to save are selected for the respective scanned images for saving. The processed result may be displayed by overlapping the device name or the folder name specified as the location to save on the corresponding scanned image.

In a document scanning apparatus according to a fifth aspect of the present invention, the display processing unit displays information about the scanned image when consecutive touch operations to the scanned image displayed on the display are sensed.

In the present invention, consecutive touch operations to the scanned image displayed on the display of the touch panel are accepted. Accordingly, the touch panel accepts a so-called double click operation and displays detailed information (for example, information such as image quality, density, size or magnification) of the scanned image. The user is able to confirm the information on the scanned images individually with a simple operation.

According to the first aspect of the present invention, the scanned image and the image to be processed are displayed on the display of the touch panel and the scanned image that is touched is accepted as the object to be processed. The process for the image to be processed that is sensed to be touched is accepted as the process to be carried out for the object to be processed. Accordingly, the scanned image and the image to be processed displayed on the display are selected in correspondence. For example, the object to be processed and the process to be carried out thereon are selected by the touch panel with a simple operation such as dragging and dropping the scanned image on the image to be processed. Therefore, operability of the document scanning apparatus is improved. The processed result is displayed on the display together with the scanned image or the image to be processed. Accordingly, the user is able to select the object to be processed and the process to be carried out while confirming the processed result, so that there is no need for the user to reattempt the work. Therefore, increased working time is prevented and the convenience of the document scanning apparatus is improved.

According to the second aspect of the present invention, the model image associated with the editing process is displayed as the image to be processed. The processed result in which the scanned image to be processed is combined with the model image is displayed. Accordingly, the user is able to select the scanned image and the model image displayed on the display in correspondence, and carry out the editing work on the touch panel. Therefore, operability of the document scanning apparatus in terms of the editing process is improved. The scanned image to be processed is displayed with the model image in combination as the processed result. Accordingly, increase in time required for editing work is restrained, and hence the convenience of the document scanning apparatus in terms of the editing process is improved.

According to the third aspect of the present invention, when the document scanning apparatus includes a function to transmit the scanned image to another apparatus, the destination image associated with the destination is displayed as the image to be processed. The scanned image to be processed is transmitted to the destination accepted by a touch to the destination image. Accordingly, the scanned image and the destination image displayed on the display are selected in correspondence, and hence the user is able to select the destinations for the respective scanned images easily. Therefore, operability and convenience of the document scanning apparatus when transmitting the scanned image are improved.

According to the fourth aspect of the present invention, when the document scanning apparatus has a function to save the scanned image to the storage device, the location-to-save image associated with the location to save is displayed as the image to be processed. The scanned image to be processed is saved in the location to save accepted by a touch to the location-to-save image. Accordingly, the scanned image and the location-to-save image displayed on the display are selected in correspondence, and the user is able to select the locations to save for the respective scanned images with ease. Therefore, operability and convenience of the document scanning apparatus when saving the scanned image are improved.

According to the fifth aspect of the present invention, when a consecutive touch operation to the displayed scanned image is sensed, information on the scanned image is displayed. Accordingly, the user is able to confirm information on the respective scanned images individually with a simple operation such as a double click operation, and hence operability and convenience of the document scanning apparatus are improved.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 2 is a diagram for explaining an operating procedure of a touch panel of the digital MFP according to the present invention.

DETAILED DESCRIPTION OF EMBODIMENTS OF THE INVENTION

Figure 1:
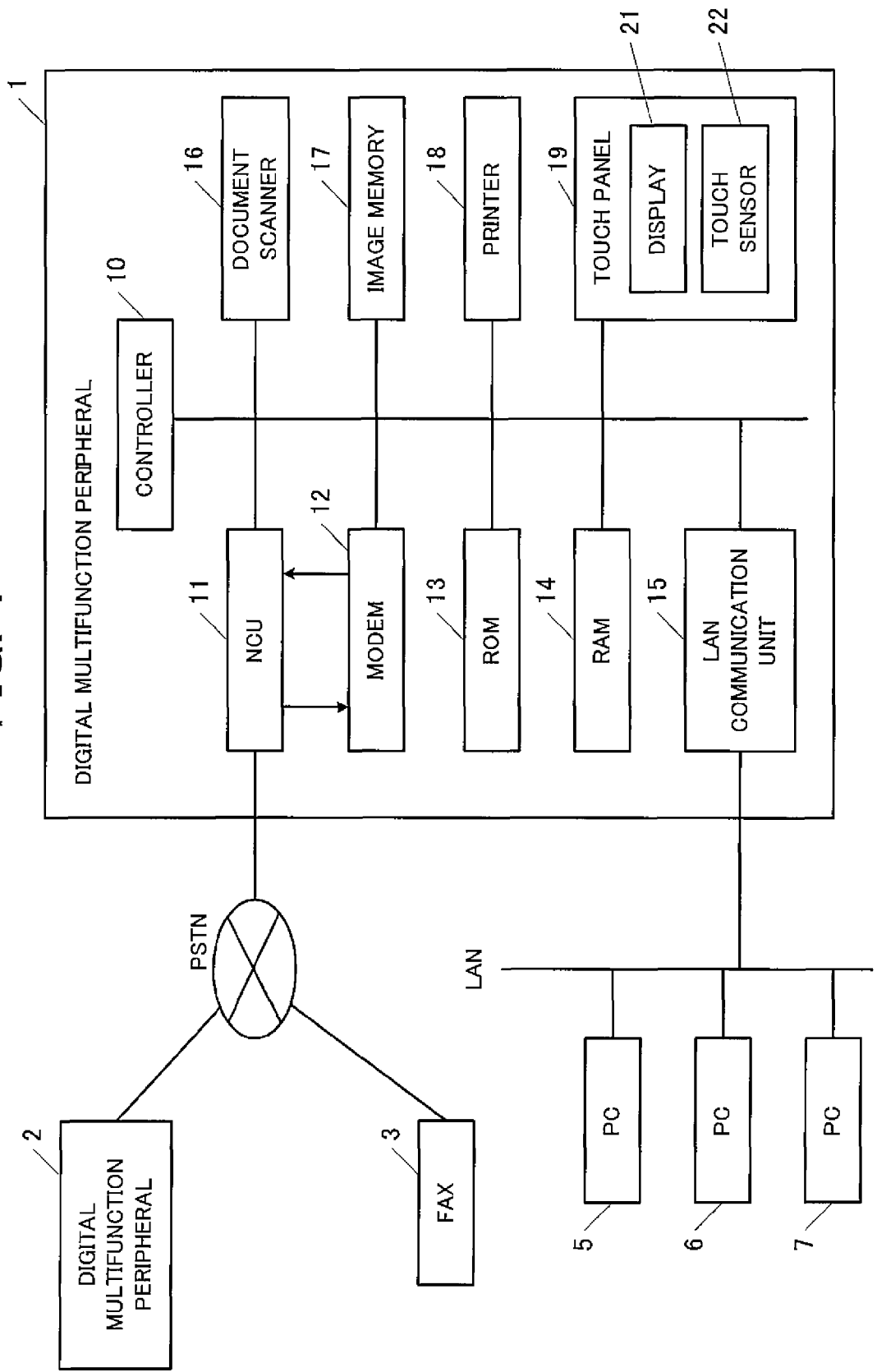
FIG. 1 is a block diagram illustrating a configuration of a digital MFP according to the present invention.

Referring to the drawings, embodiments of the present invention will be described in detail. A digital multifunction peripheral (MFP) is described as an example a document scanning apparatus. FIG. 1 is a block diagram illustrating a configuration of digital MFP 1 according to the present invention. Digital MFP 1 has a plurality of functions such as a copying function for copying documents, a facsimile function for transmitting and receiving data via Public Switched Telephone Network (PSTN), a scanning function for scanning documents to acquire images, and a printing function for printing images provided via a network such as a Local Area Network (LAN) onto printing paper. The digital MFP 1 is connected to a plurality of PCs 5, 6, 7, . . . via the LAN. Accordingly, the digital MFP 1 can receive data transmitted from the PCs 5, 6, 7, . . . and prints the data on printing paper by the printer function, and can transmit scanned images of a document to PCs 5, 6, 7, . . . by the scanner function. The digital MFP 1 is connected to apparatuses such as another digital MFP 2 provided separately, and a facsimile (FAX) 3 via the PSTN, so that images are transmitted and received between the apparatuses via audio signals.

The digital MFP 1 includes a Network Control Unit (NCU) 11, a modem 12, a Read Only Memory (ROM) 13, a Random Access Memory (RAM) 14, a LAN communication unit 15, a document scanner 16, an image memory 17, a printer 18, a touch panel 19 and a controller 10 for controlling operations in these units. The controller 10 is composed of a Central Processing Unit (CPU), a Micro Processing Unit (MPU) and the like. The controller 10 controls operations of the units of the digital MFP 1 and realizes various software functions by reading out and executing programs and data stored in the ROM 13 in advance. The ROM 13 is composed of a nonvolatile memory element such as a mask ROM, an Electrically Erasable Programmable ROM (EEPROM) or a flash memory and stores various software programs required for operating the digital MFP 1 in advance. The RAM 14 stores temporary data generated when the controller 10 controls the respective units or carries out arithmetic processing, and is composed of a rewritable memory element such as a Static RAM (SRAM) or a Dynamic RAM (DRAM).

The NCU 11 is hardware for closing and opening a circuit with respect to the PSTN, and has an interface circuit with respect to the PSTN and the modem 12. The modem 12 is hardware for carrying out a facsimile communication with the digital MFP 2 or the FAX 3 via the PSTN. The modem 12 converts digital data of an image acquired by scanning the document to analog audio signals when carrying out data transmission via facsimile communication and converts analog audio signals received via the PSTN to a digital data image when receiving data. The LAN communication unit 15 includes a connector for connecting a LAN cable. The LAN communication unit 15 is connected to a LAN such as an in-house LAN or a home LAN via the LAN cable, which is connected to the connector, for transmitting and receiving data with the PCs 5, 6, 7, . . . The LAN communication unit 15 can store data directly in the storage devices in the PCs 5, 6, 7 . . . , and can transmit data to the PCs 5, 6, 7, . . . as an e-mail.

The digital MFP 1 includes the document scanner 16 for scanning a document when using the copying, facsimile and scanner functions and the like, and the printer 18 for printing images onto printing paper when using the copying, facsimile and scanner functions and the like. The document scanner 16 scans a document with an optical unit having a CCD image sensor and stores images acquired by scanning in the image memory 17. The document scanner 16 has an ADF, so that a plurality of documents are scanned automatically.

The image memory 17 temporarily stores images received by facsimile communication via the modem 12 and the NCU 11 and images scanned by the document scanner 16, and is composed of a high-capacity memory element such as a DRAM or a flash memory. The printer 18 includes a light source such as a semiconductor laser or a LED, a photosensitive member for attaching toner, and a fuser unit for transferring toner to the printing medium by heat or pressure and fixing the same thereto. The printer 18 reads out an image stored in the image memory 17, and selects printing paper in an optimal size from A3 vertical, B4 vertical, A4 vertical, B5 lateral, A5 lateral, etc. before printing.

The touch panel 19 includes a display 21 composed of a liquid crystal display and a touch sensor 22 which senses a touch to the display 21. The display 21 displays the operating state of the digital MFP 1, a selection menu for a user to select a function of the digital MFP 1, a setting menu for setting the respective functions, and information to be prompted to the user such as operating guide messages or warning messages. Images for displaying these items are stored in the ROM 13 in advance, and the controller 10 reads out a corresponding image from the ROM 13 and provides the same to the touch panel 19.

The digital MFP 1 according to the present invention can also display a list of the images of documents scanned by the document scanner 16 on the display 21. The controller 10 reduces the size of the image stored in the image memory 17 into a size that can be displayed on the display 21 and provides the same to the touch panel 19 for a so-called thumbnail display on the display 21.

A sensor employing an analog capacity coupling system may be used as the touch sensor 22 of the touch panel 19. A touch sensor of the analog capacity coupling system includes a conductive film coated uniformly on the surface of the display 21 for covering with electric field and measure the change of the capacity coupling due to the change of the electric field generated when a user's finger touches thereto, so that the touched point is specified. Therefore, by using the touch sensor 22, a touch to the display 21 is detected, and the touched position is specified to determine which one of the menu items or icons displayed on the display 21 is touched. The touch sensor 22 notifies the sensed result to the controller 10.

The digital MFP 1 according to the present invention can sense the operation that the user touches and releases his/her finger to the display 21 of the touch panel 19 as a touch operation. The digital MFP 1 can also sense a touch operation that the user touches consecutively to the substantially the same position on the display 21 as a consecutive touch operation. The digital MFP 1 also senses the operation that the user touches the display 21, then moves his/her finger to another position on the display 21 in the touched state, and then releases his/her finger, as a drag & drop operation. Accordingly, the user operates the digital MFP 1 with the same sense of click, double-click and drag & drop operations using a mouse provided in a PC or the like. The touch sensor 22 of the touch panel 19 only senses the touch to the display 21 and determines the touched position, and the controller 10 which receives the notification thereof determines whether or not a consecutive touch operation or a drag & drop operation has been done. However, a touch panel 19 that determines whether or not a consecutive touch operation or a drag & drop operation has been done may also be used.

The copying function of the digital MFP 1 is realized by storing an image acquired by scanning a document by the document scanner 16 in the image memory 17, reading out the image and printing the read-out image to printing paper by the printer 18. The facsimile function is realized by passing an image acquired by scanning a document by the document scanner 16 to the modem 12, transmitting the image to the another digital MFP 2 and the FAX 3 via the PSTN by the modem 12 and the NCU 11, and storing an image received from the digital MFP 2 or the FAX 3 in the image memory 17, and reading out and printing the image on printing paper by the printer 18. The printing function is realized by storing an image received from the PCs 5, 6, 7, . . . via the LAN in the image memory 17, and reading out and printing the image on printing paper by the printer 18. The scanning function is realized by storing an image acquired by scanning a document by the document scanner 16 in the image memory 17, and reading out and storing the image in the storage device in the PCs 5, 6, 7, . . . by the LAN communication unit 15 via the LAN or by transmitting the image as e-mail.

According to the present invention, for example, when a user copies a document using the copying function, the user is able to set various conditions such as aggregated copy or duplex copy before copying. The setting of conditions may be achieved by selecting the menu item, image, and the icon displayed on the touch panel 19 via the touch, consecutive touch and drag & drop operations described above. Setting of destinations when transmitting a document via the facsimile function, setting of destinations of storage when storing an image acquired by scanning a document via the scanning function into the storage devices in the PCs S, 6, 7, . . . , and setting of destinations when transmitting the same as an e-mail, etc. are also the same.

FIGS. 2-8 are diagrams for explaining operating procedures of the touch panel 19 of the digital MFP 1 according to the present invention. The menu, icons and images displayed on the display 21 of the touch panel 19 are shown. In the drawings, the operating procedure is illustrated from (a) to (h) in time series, assuming that a plurality of documents are printed on both surfaces of printing paper in an aggregated manner using the copying function of the digital MFP 1.

When the digital MFP 1 is in a waiting state (a state in which a process such as copying or facsimile transmission is not in operation), a menu for selecting the function of the digital MFP 1 to be used is displayed on the display 21 of the touch panel 19 (FIG. 2(a)). In the menu illustrated in the drawings, the user is able to select four functions; a copying function, a facsimile function, a scanner function for specifying where to store a scanned document ("storing function") and a scanner function to transmit a scanned document via e-mail ("mailing function"). Displayed on the display 21 are an icon 31 in a substantially elongated circular shape for selecting the copying function with a word "COPY", an icon 32 for selecting the storing function with a word "STORE", an icon 33 for selecting the facsimile function with a word "FAX", an icon 34 for selecting the mailing function with a word "MAIL", and an OK icon 35 for fixing the selection via these four icons. The icons 31-34 are highlighted by an inverted or flashing display (hatched in FIG. 2) when touched by the user. In this state, when the user touches the OK icon 35, the selection of function to be used is fixed.

When the copying function is selected, the digital MFP 1 renews the display items of the display 21, and displays a message 41 prompting the user to set the documents on the ADF of the document scanner 16. Then, the digital MFP 1 displays a start icon 42 to be used by the user for issuing a command to start scanning of the document to the digital MFP 1 and an icon 43 for returning display 21 to the menu display for selecting the functions ( FIG. 2(b)). The user sets the documents on the ADF of the document scanner 16 and then touches the start icon 42, so that scanning of the document is started. When the icon 43 is touched, selection of the functions is enabled again.

Figure 3:
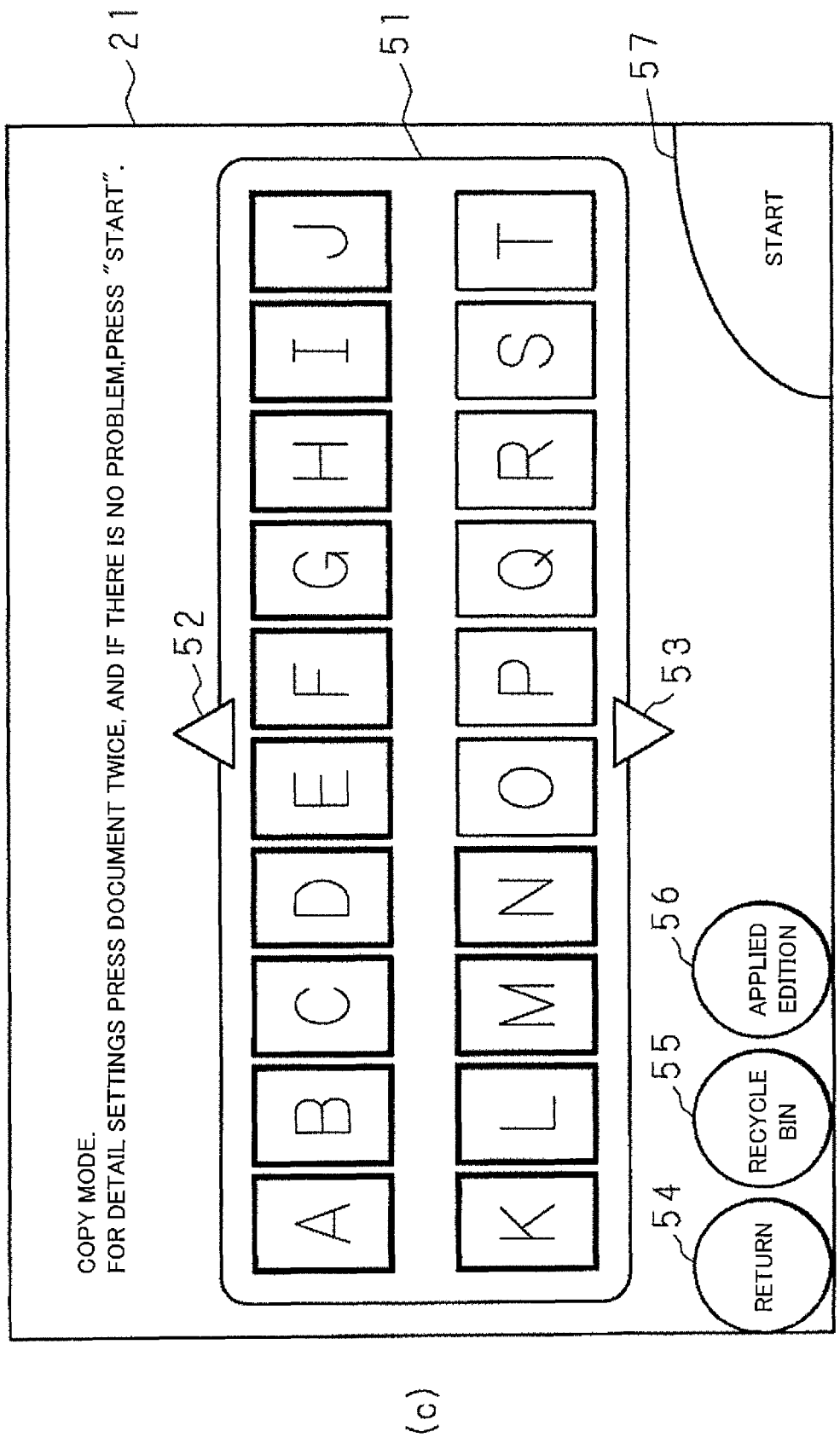
FIG. 3 is a diagram for explaining the operating procedure of the touch panel of the digital MFP according to the present invention.

When scanning of the documents by the document scanner 16 is terminated, the digital MFP 1 displays a list of the images acquired by the scanning operation ("scanned image") (FIG. 3(c)). The scanned images are then tiled within a list display area 51 defined by a square frame displayed on the substantially center of the display 21 in a scanned sequence (scanned images A to T). When the number of scanned images exceeds the number that can be displayed in the list display area 51, the display of the scanned images in the list display area 51 is scrolled upward and downward by touching an upward scroll icon 52 or a downward scroll icon 53 provided at the top and bottom of the list display area 51. The scanned images displayed in the list display area 51 are reduced to adequate sizes. The user selects images by touching the images from the scanned images. The digital MFP 1 highlights the selected scanned images by inverting, flashing or surrounding with a thick frame, etc. (in FIG. 3, the selected scanned images A-N are surrounded by thick frames).

In the list display area 51 and the display 21, an icon 54 for returning display 21 to the previous display, a recycle bin icon 55 for deleting scanned images, an applied edition icon 56 for performing applied edition such as aggregated copying or duplex copy, and a start icon 57 for starting printing and copying of scanned images are displayed below the list display area 51. When the user touches the start icon 57, printing of the scanned images selected in the list display area 51 is started. When none of the scanned image in the list display area 51 is selected, all the scanned images are printed.

When a page that is not intended to scan is included in the documents set on the ADF of the document scanner 16, the user is able to delete the scanned image in question using the recycle bin icon 55 to exclude the same from the images to be copied. For example, when deletion of the scanned document A is desired, the user deletes the scanned document A by selecting the scanned document A by the touch operation and then touching the recycle bin icon 55. The user deletes the scanned document A by a drag & drop operation comprising touching the scanned document A displayed on the display 21 with his/her finger, moving his/her finger to the recycle bin icon 55 while keeping in touch with the display 21, and then removing his/her finger from the recycle bin icon 55.

Figure 4:
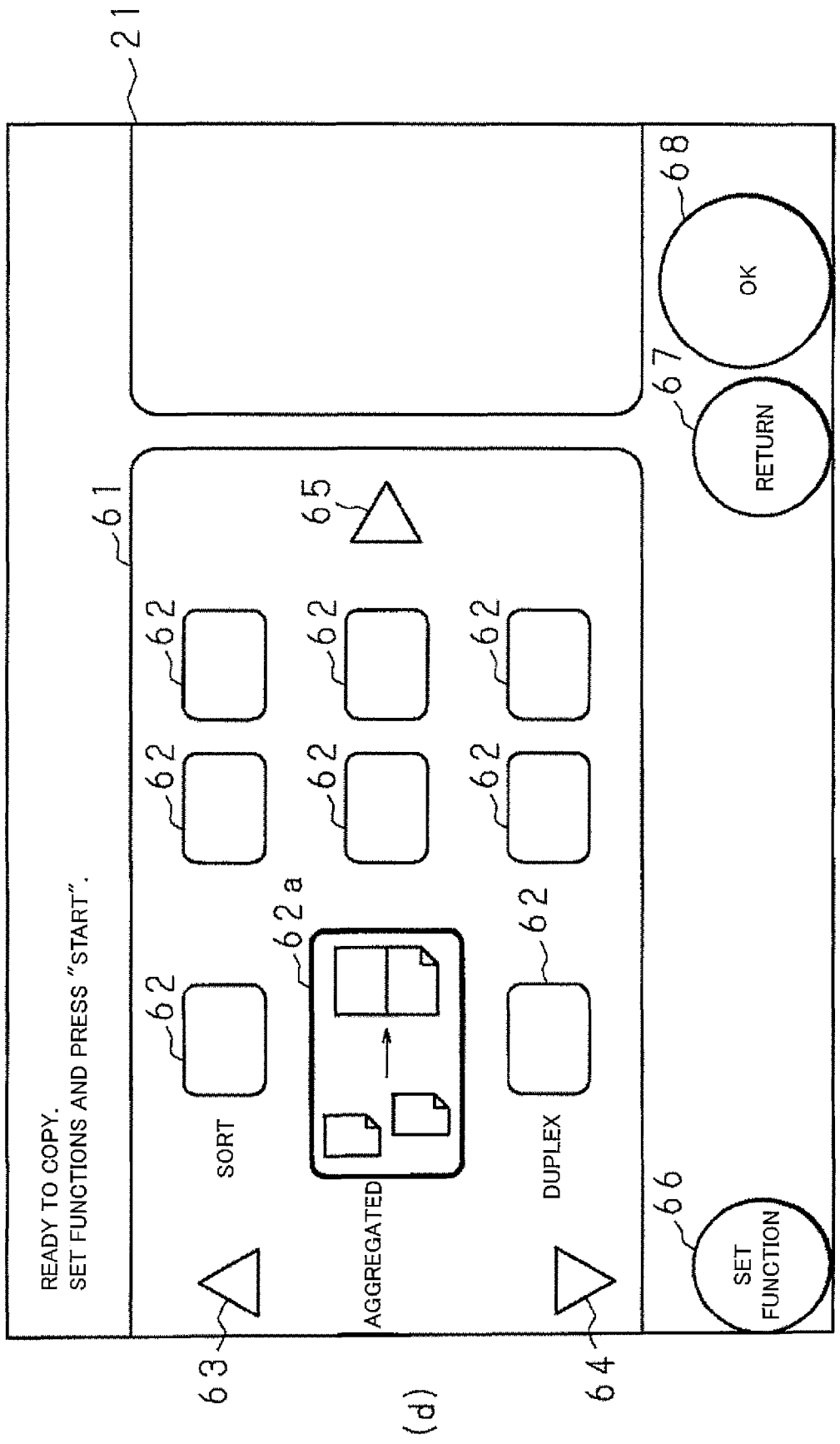
FIG. 4 is a diagram for explaining the operating procedure of the touch panel of the digital MFP according to the present invention.
Figure 5:
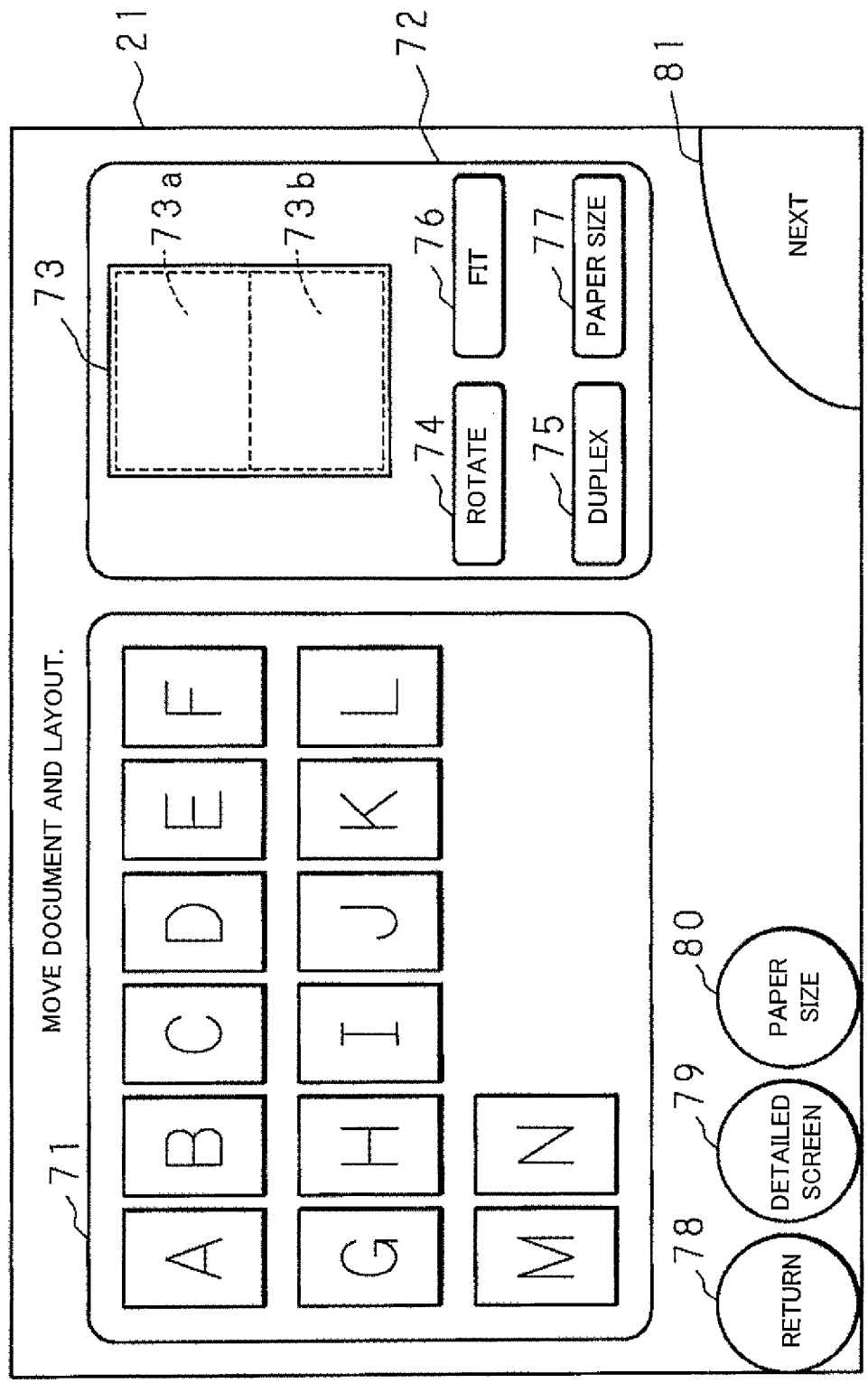
FIG. 5 is a diagram for explaining the operating procedure of the touch panel of the digital MFP according to the present invention.
Figure 6:
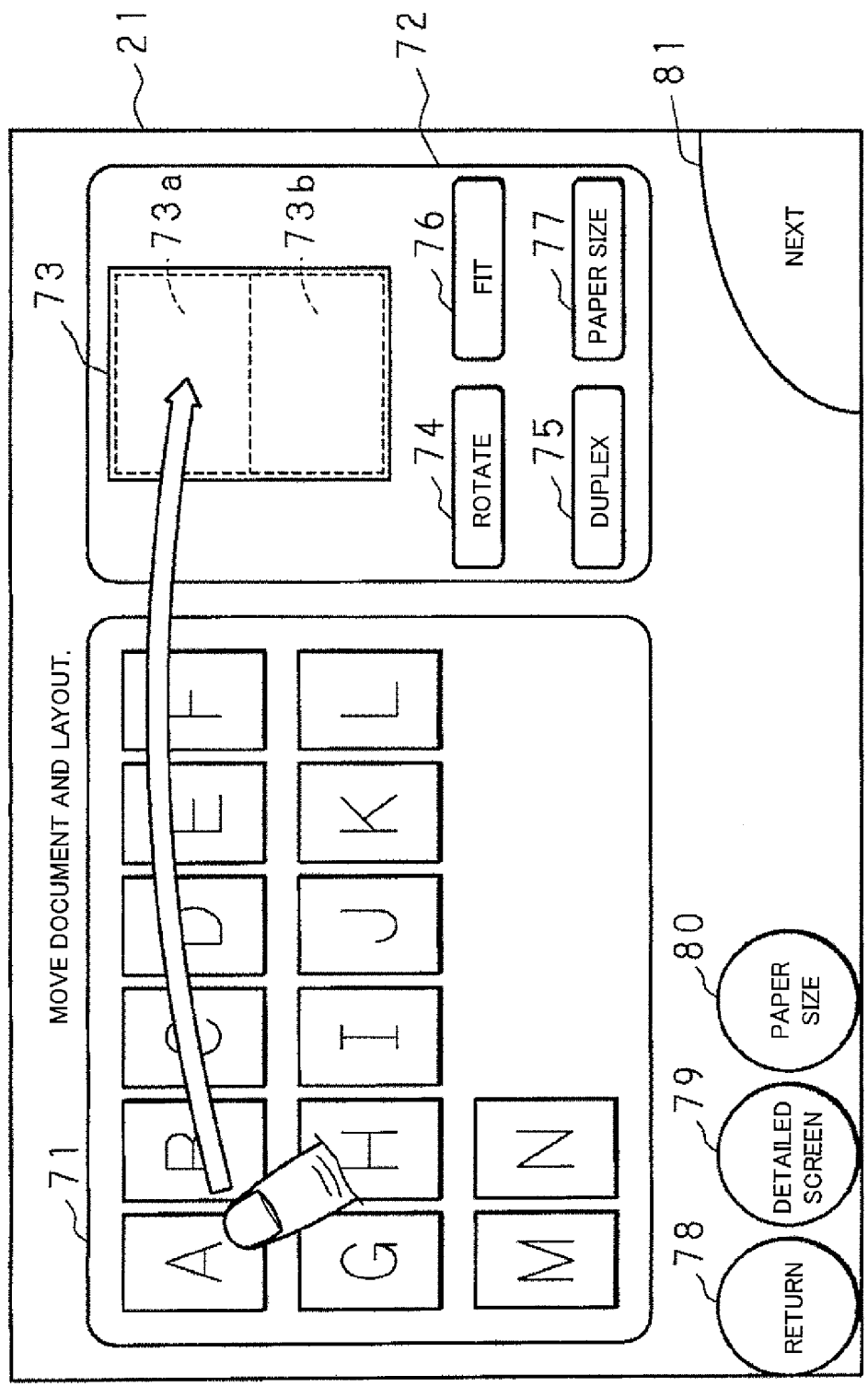
FIG. 6 is a diagram for explaining the operating procedure of the touch panel of the digital MFP according to the present invention.
Figure 7:
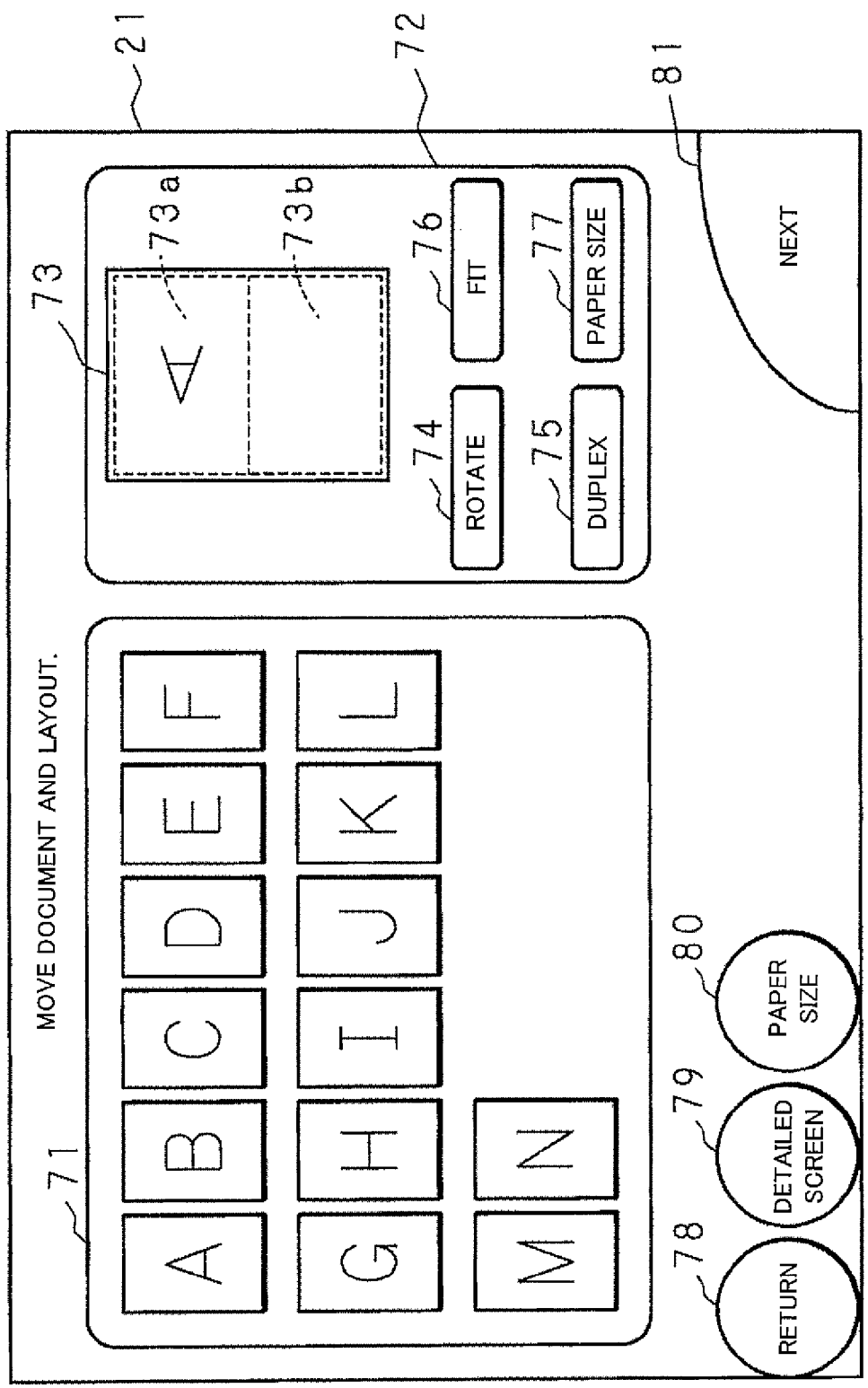
FIG. 7 is a diagram for explaining the operating procedure of the touch panel of the digital MFP according to the present invention.
Figure 8:
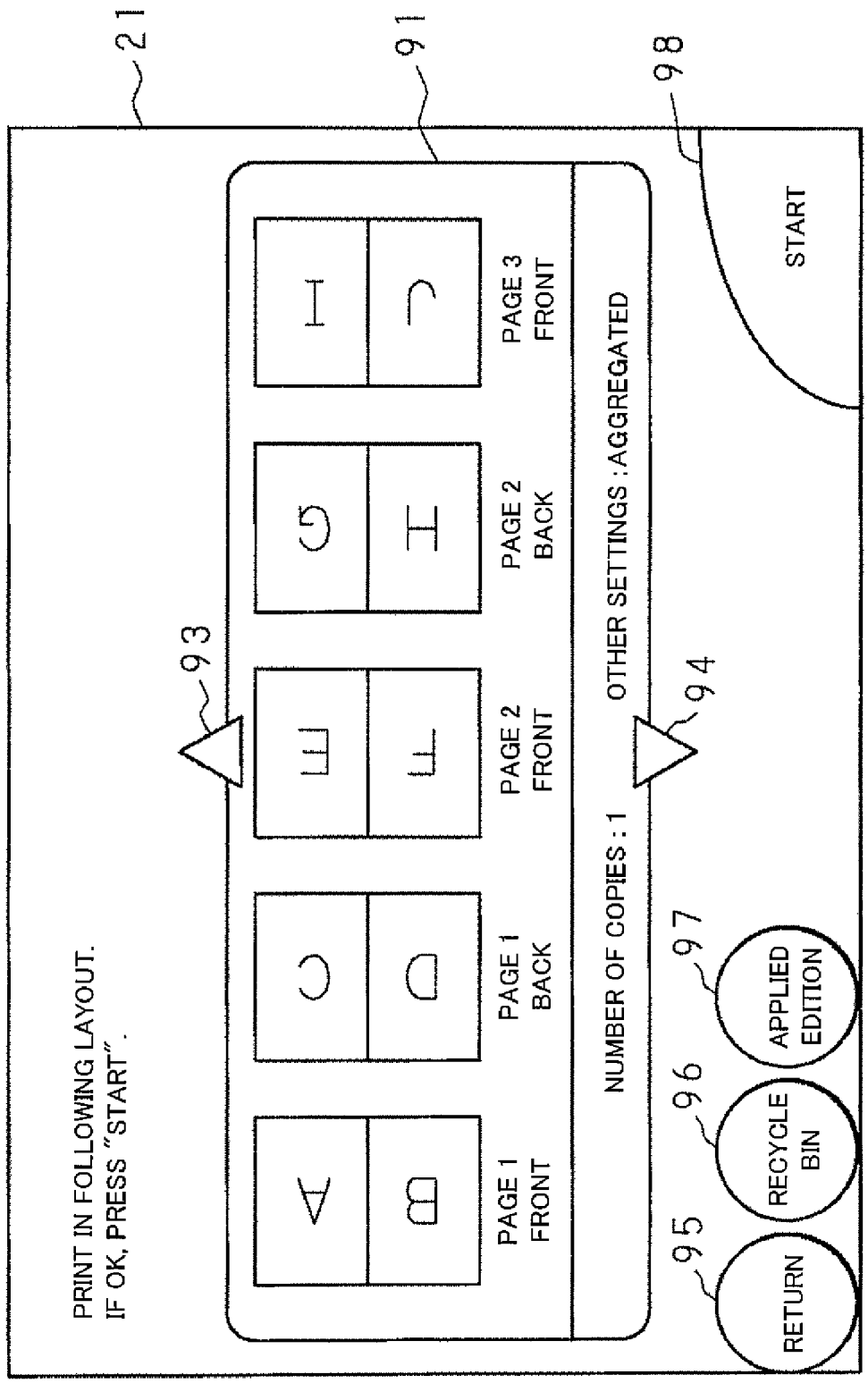
FIG. 8 is a diagram for explaining the operating procedure of the touch panel of the digital MFP according to the present invention.

The user selects whether or not the applied function such as the aggregated copy or the duplex copy is used for copying by touching the applied edition icon 56. The digital MFP 1 renews the display on the display 21 in association with the touch operation to the applied edition icon 56, and displays a menu for selecting the applied functions (FIG. 4(d)). At this time, a plurality of applied function icons 62 that are allocated to the applied functions are tiled laterally and vertically in a matrix pattern in an applied function icon display area 61 defined by a square frame displayed in the substantially center of the display 21. One applied function icon 62a of the applied function icons 62 positioned at the center of the leftmost column in the applied function icon display area 61 is displayed in an enlarged scale. The currently selected applied function corresponds to the applied function icon 62a displayed in an enlarged scale. In the example of FIG. 4, an aggregated copy function for aggregating two pages of documents and copying on one piece of printing paper is selected.

The applied function icon display area 61 includes an upward scroll icon 63, a downward scroll icon 64 and a rightward scroll icon 65 displayed therein, respectively at the upper, lower and right portions. By touching the upward scroll icon 63 or the downward scroll icon 64, all the applied function icons 62 displayed in the applied function icon display area 61 are scrolled upward and downward. By touching the rightward scroll icon 65, a row of the applied function icons 62 displayed at the center of the applied function icon display area 61 are scrolled rightward. Accordingly, the user is able to move one of the applied function icons 62 to the center of the leftmost column of the applied function icon display area 61 to select the applied function.

Displayed below the applied function icon display area 61 are a function setting icon 66 for setting details about the hardware of the digital MFP 1, an icon 67 for returning display 21 back to the previous display, and an OK icon 68 to fix the selection of the applied function selected by the applied function icon display area 61. When the user touches the OK icon 68, the digital MFP 1 renews the display on the display 21, and the menu for carrying out detailed settings and editions, etc. on the selected applied function. FIG. 5(e) illustrates an example of display of the edit menu when the aggregated copying function for aggregating two pages of documents and copying on one piece of printing paper is selected as the applied function.

At this time, the digital MFP 1 displays a list of scanned images (A to N) selected in the list display area 51 of FIG. 3(c) in a list display area 71 defined by a square frame on the left side of the display 21. An edit icon display area 72 surrounded by a square frame is displayed on the right portion of the display 21. A model icon 73 is displayed on the upper portion, and a rotation icon 74, a duplex icon 75, a fit icon 76, and a paper size icon 77 are tiled in a matrix pattern on the lower portion in the edit icon display area 72.

The model icon 73 illustrated in FIG. 5(e) is a graphic roughly illustrating a state in which one surface of the printing paper is divided into upper and lower areas 73a and 73b by a broken line, and the user is able to select either the upper area 73a or the lower area 73b by the touch operation. For example, as illustrated in FIG. 6(f), the user carries out a series of operations to keep his/her finger in touch with one of the scanned images displayed in the list display area 71 (image A, for example) and, in this state, move his/her finger to the upper area 73a of the model icon 73 (as indicated by a hollow arrow) along the surface of the display 21, and release his/her finger in the upper area 73a (that is, a drag & drop operation to drag and drop the scanned image A onto the upper area 73a). With this series of operations, the user carries out the edit operation to combine the scanned image A with the model of the aggregated copying and specify the scanned image A as an image to be printed on the upper half of the printing paper. After carrying out the series of operations, the digital MFP 1 combines the scanned image A with the model icon 73 and displays the same as the result of edit operation (see FIG. 7(g)).

The rotation icon 74 in the edit icon display area 72 is for rotating the scanned image combined with the upper area 73a of the model icon 73 and changing the orientation of the same when touched by the user after the upper area 73a of the model icon 73 is selected. The duplex icon 75 is for reversing the printing paper to be displayed as the model icon 73 when using the duplex copy function together with the aggregated copy function as an applied function. The fit icon 76 is for compressing and expanding the scanned image to match the size of the printing paper when documents including pages having different sizes (such as, for example, A4 and A3 sizes) are scanned by the document scanner 16. The paper size icon 77 is for changing the size of the printing paper to be displayed as the model icon 73.

Displayed below the list display area 71 are an icon 78 for returning the display 21 back to the previous display, a detailed screen icon 79 for displaying detailed information on the respective scanned images, and a paper size icon 80 for changing the size of the printing paper used for printing. Displayed below the edit icon display area 72 is an icon 81 for proceeding to the next step for copying after having fixed and terminated the edit operation. The detailed screen displayed on the display 21 by touching the detailed screen icon 79 will be described later. The paper size icon 80 and the paper size icon 77 of the edit icon display area 72 are both for changing the size of the printing paper. However, the size of the pages to be printed is changed entirely by using the paper size icon 80, while only the size of the specific page is changed by using the paper size icon 77 of the edit icon display area 72. When the icon 81 is touched by the user, the digital MFP 1 renews the display on the display 21 and displays the list of the result of the edit operation (see FIG. 8(h)).

At this time, the digital MFP 1 tiles preview images of the printed materials to be outputted as the copy result in a list display area 91 defined by a square frame at the substantially center of the display 21. In the example illustrated in FIG. 8(h), the result of selecting and editing the functions of the aggregated copy and the duplex copy is illustrated, and the preview images are tiled in the sequence of output such as the front surface of the first piece, the back surface of the first piece, the front surface of the second piece, the back surface of the second piece . . . and so forth. When the number of pieces to be outputted exceeds the number of images which can be displayed in the list display area 91, the user can touch an upward scroll icon 93 or a downward scroll icon 94 provided on the upper and lower portions of the list display area 91 in order to scroll the display of the preview images in the list display area 91 upward or downward.

Displayed below the list display area 91 are an icon 95 for returning display 21 to the previous display, a recycle bin icon 96, an applied edition icon 97 and a start icon 98. The recycle bin icon 96 has the same function as that of FIG. 3(c), so that the user can delete selected output preview images from those displayed in the list display area 91. The applied edition icon 97 also has the same function as that of FIG. 3(c), so that the user can touch and display the menu illustrated in FIG. 4(d) on the display 21 and then select one of the various applied functions. When the output preview images displayed in the list display area 91 are satisfactory, the user touches the start icon 98 to start copying, and the digital MFP 1 prints and outputs images equivalent to the preview images displayed in the list display area 91 on the printing paper.

As described thus far, with the digital MFP according to the present invention, the user is able to achieve the applied edition settings with a simple drag & drop of the scanned images displayed on the display 21 of the touch panel 19 to the model icon 73 for edition. The scanned images selected by the user are combined with the model icon 73 and displayed. Therefore, the user is able to operate while confirming the images to be printed on the printing paper. Therefore, the need for reattempts due to erroneous operations is prevented.

Figure 9:
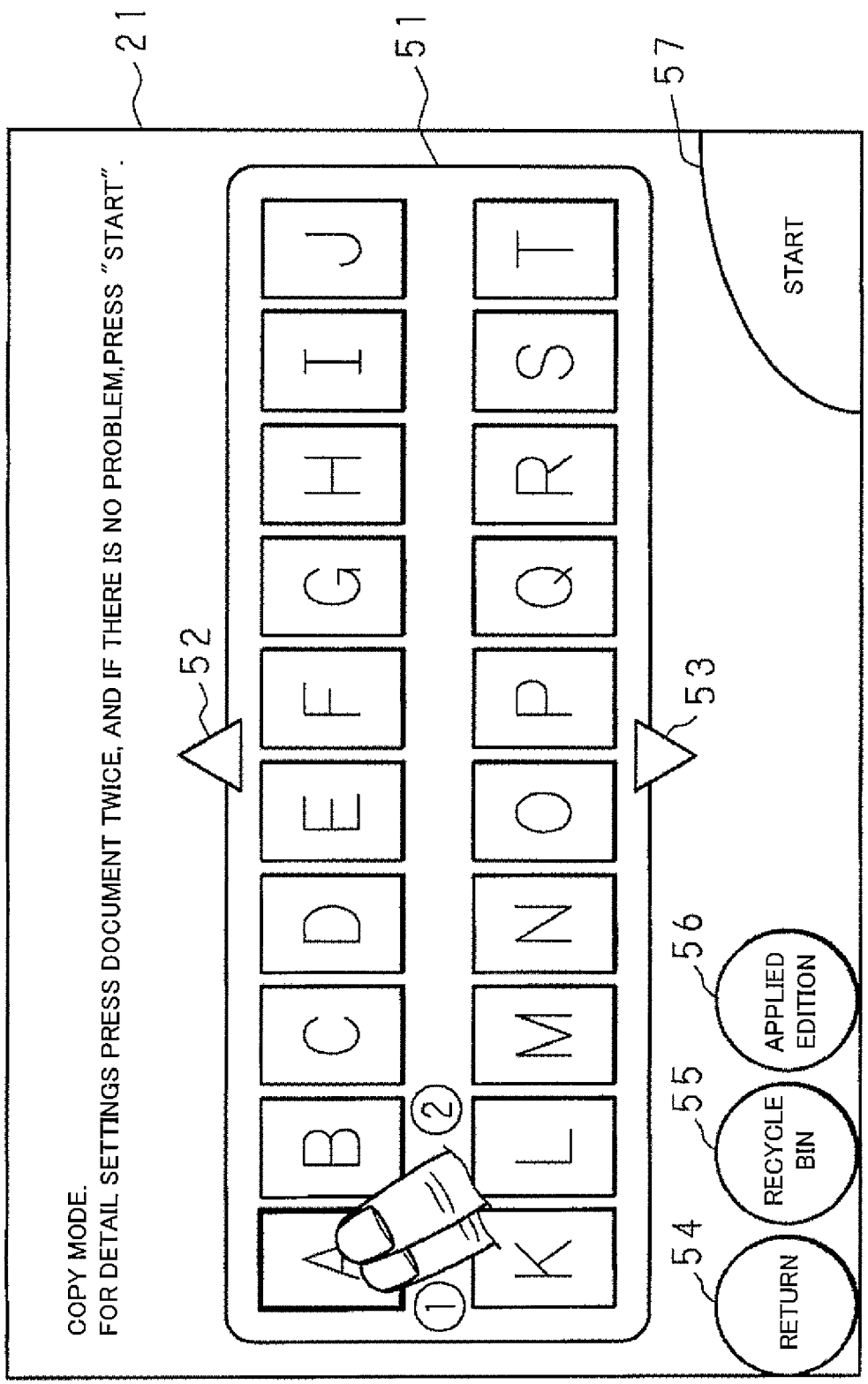
FIG. 9 is a diagram for explaining the operating procedure of the touch panel of the digital MFP according to the present invention.
Figure 10:
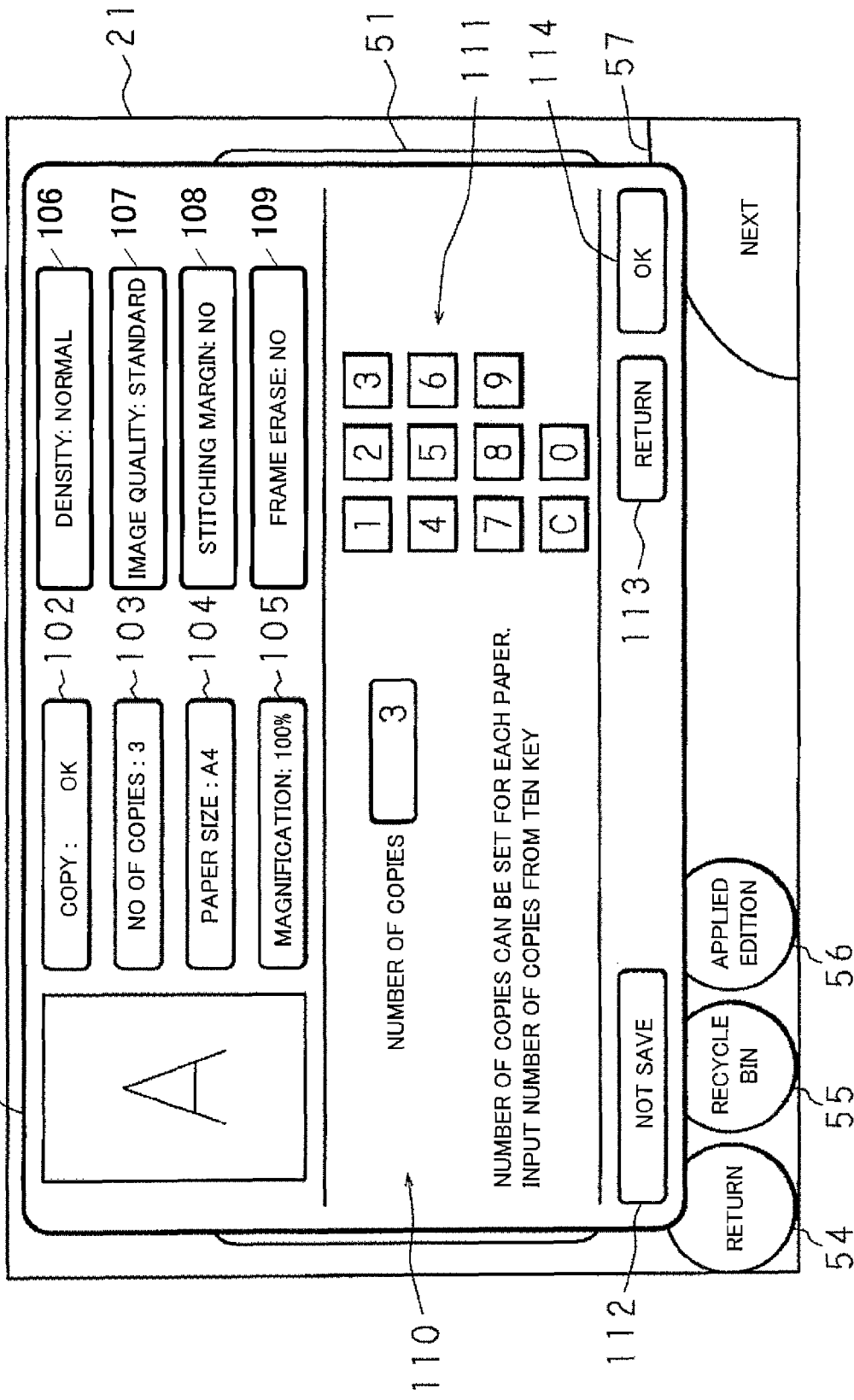
FIG. 10 is a diagram for explaining the operating procedure of the touch panel of the digital MFP according to the present invention.

A method of displaying detailed information on the scanned images displayed on the display 21 of the MFP 1 (for example, scanned images displayed in the list display area 51 in FIG. 3(c) or the list display area 71 in FIGS. 5(e)-7(g)) is now described. FIGS. 9 and 10 explain the operating procedure of the touch panel 19 of the digital MFP 1 according to the present invention. For example, when detailed information on the scanned image A is confirmed in the state illustrated in FIG. 3(c), the user touches the scanned image A displayed in the list display area 51 twice consecutively within a predetermined time (for example, within one second) (see FIG. 9). The digital MFP 1 accepts the consecutive touch operation to the scanned image A and displays a detailed information window 100 on the display 21 (see FIG. 10).

In the upper portion of the detailed information window 100, the scanned image A is displayed on the left side, and a plurality of settings about the scanned image A are tiled on the right side as icons 102-109. In the example of FIG. 10, indications of whether to copy the scanned image A or not, the number of copies of the scanned image A, the size of the printing paper used for copying, the magnification of copy, density of copy, image quality, presence or absence of stitching margin, whether to erase the frame or not, and so on are displayed, respectively, on the icons 102-109. The user selects one of the icons 102-109 by touch operation, and a setting entry area 110 for carrying out settings relating to the selected icon 102-109 is provided at the center of the detailed information window 100. FIG. 10 illustrates a case in which the icon 103 relating to the settings of the number of copies is touched by the user. In this case, the digital MFP 1 displays the current setting of the number of copies in the setting entry area 110, displays a ten-key icon 111, accepts entry of number from the user, and fixes the accepted number as the set value of the number of copies.

Displayed in the lower portion of the detailed information window 100 are a storage setting icon 112 for allowing the user to select whether or not to store the settings of the detailed information window 100, an icon 113 for closing the detailed information window 100 without reflecting the settings changed in the detailed information window 100, and a final selection icon 114 for reflecting the settings and closing the detailed information window 100. When storage of settings is selected by the storage setting icon 112, the digital MFP 1 stores the setting values set in the detailed information window as default values. When the final selection icon 114 is touched, the digital MFP 1 reflects the settings set in the detailed information window 100. However, the settings are only for the selected scanned image A, and are not reflected to other scanned images B-T.

As described thus far, with the digital MFP 1 according to the present invention, the user can easily confirm detailed information on the scanned images in the detailed information window 100 with a simple operation of consecutively touching the scanned image displayed on the display of the touch panel 19. The settings of the scanned images may be changed individually in the detailed information window 100. For example, when the documents include a mixture of pages with photographs and pages with texts, the settings can be changed individually. Therefore, convenience of the digital MFP 1 is enhanced. In FIGS. 9 and 10, a case in which the scanned image is consecutively touched in the state of FIG. 3(c) is illustrated. However, the present invention is not limited thereto, and applies, for example, to a configuration in which the detailed information window 100 is also displayed when the scanned image in the list display area 71 is touched consecutively in the state of FIG. 5(e). In the same manner, the invention applies to a configuration in which the detailed information window 100 is also displayed when the preview image in the list display area 91 is touched consecutively in the state of FIG. 8(h).

Operation of the digital MFP 1 in the facsimile mode is now described. FIGS. 11-14 explain the operating procedure of the touch panel 19 of the digital MFP according to the present invention, and illustrate states after the icon 33 is touched to select the facsimile function in the state of FIG. 2(a), and the scanning of the document is completed. The operating procedure is illustrated from FIG. 11 to FIG. 14 in time series.

After having scanned the documents, the digital MFP 1 displays the list of registered destinations on the display 21 of the touch panel 19 (see FIG. 11(a)). At this time, the digital MFP 1 tiles a plurality of destination icons laterally and vertically in a matrix pattern in a destination icon list display area 120 defined by a square frame shown at the center of the display 21. The destination icons are registered in advance, and are composed of an appellation of the destination and one or more types of sketch images combined with each other. Although not illustrated, detailed settings about the destination (for example, the facsimile number) are displayed by consecutively touching the respective destination icons.

Three tabs 121-123 are provided in the upper portion of the destination icon list display area 120. The user is able to select and change the display type of the destination icons displayed in the destination icon list display area 120 by touching one of the tabs 121-123. When the tab 121 indicated as "ALL DESTINATIONS" is selected, the digital MFP 1 displays all registered destination icons in the destination icon list display area 120. When the tab 121 indicated as "GROUP" is selected, the digital MFP 1 displays the destination icons in groups that are classified by the user in advance. When the tab 123 indicated as "a, b, c . . . " is selected, the destination icons are displayed in groups classified alphabetically in terms of the appellation of the destinations.

An upward scroll icon 124 and a downward scroll icon 125 are displayed, respectively, at the upper and lower portions of the destination icon list display area 120. When the user touches the upward scroll icon 124 or the downward scroll icon 125, the display in the destination icon list display area 120 is scrolled upward or downward. The user can select any of the destination icons by touching the destination icon in the destination icon list display area 120. The digital MFP 1 highlights the destination icons by inverted display, flashing display or a display surrounded by a thick frame (in FIG. 11, the selected destination icons "Mr. A", "Mr. B" and "Mr. C" are surrounded by the thick frame).

Displayed in the lower portion of the destination icon list display area 120 are an icon 126 for returning the display 21 to the previous display, a dial icon 127 for setting the destination by inputting the facsimile number directly, a select all icon 128 for selecting all destination icons displayed in the destination icon list display area 120, a setting registration icon 129 for displaying a menu for registering new destinations, and an icon 130 for finally fixing the selection of the destination icons and moving to the next step. When the digital MFP 1 accepts a touch operation to the icon 130 indicated as NEXT, the digital MFP 1 renews the display on the display 21, and displays a list of the scanned images of the documents scanned by the document scanner 16 (see FIG. 12).

At this time, the digital MFP 1 displays the list of the scanned images acquired by document scanner 16 in a list display area 140 defined by a square frame displayed from the center to the upper portion of the display 21. When the user touches an upward scroll icon 141 and a downward scroll icon 142 provided, respectively, at upper and lower portions of the list display area 140, the scanned images in the list display area 140 are scrolled upward and downward.

Figure 11:
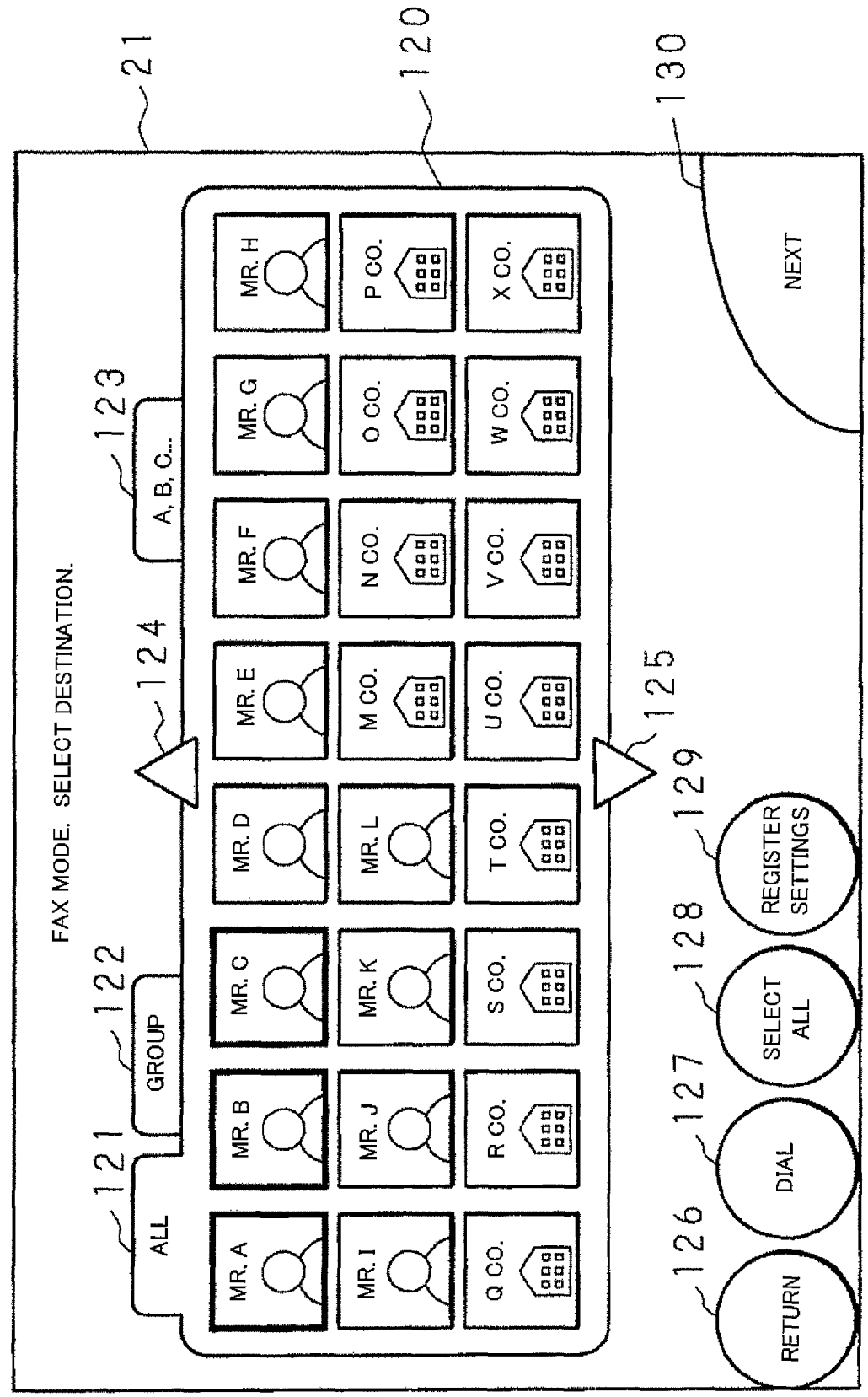
FIG. 11 is a diagram for explaining the operating procedure of the touch panel of the digital MFP according to the present invention.
Figure 12:
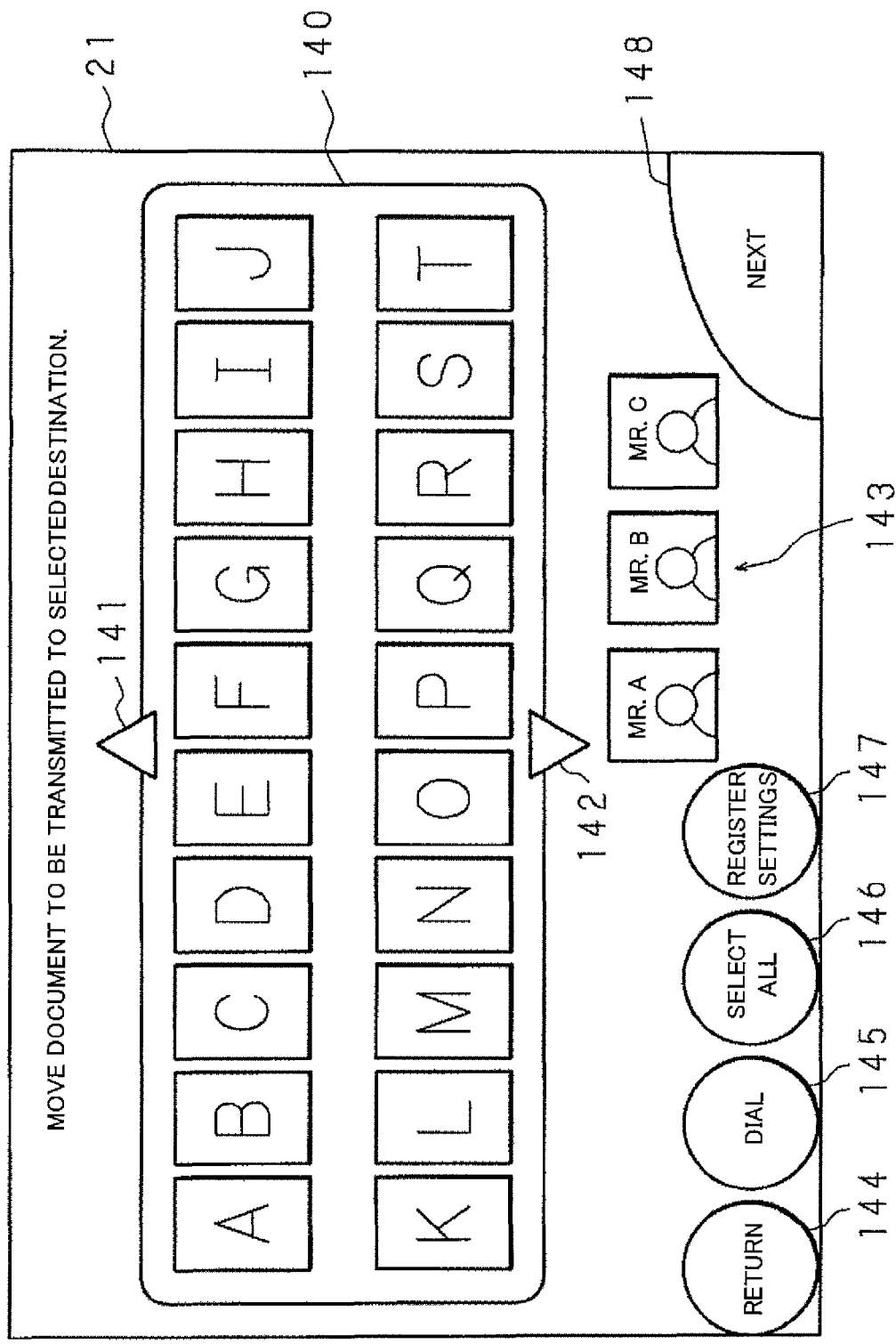
FIG. 12 is a diagram for explaining the operating procedure of the touch panel of the digital MFP according to the present invention.
Figure 13:
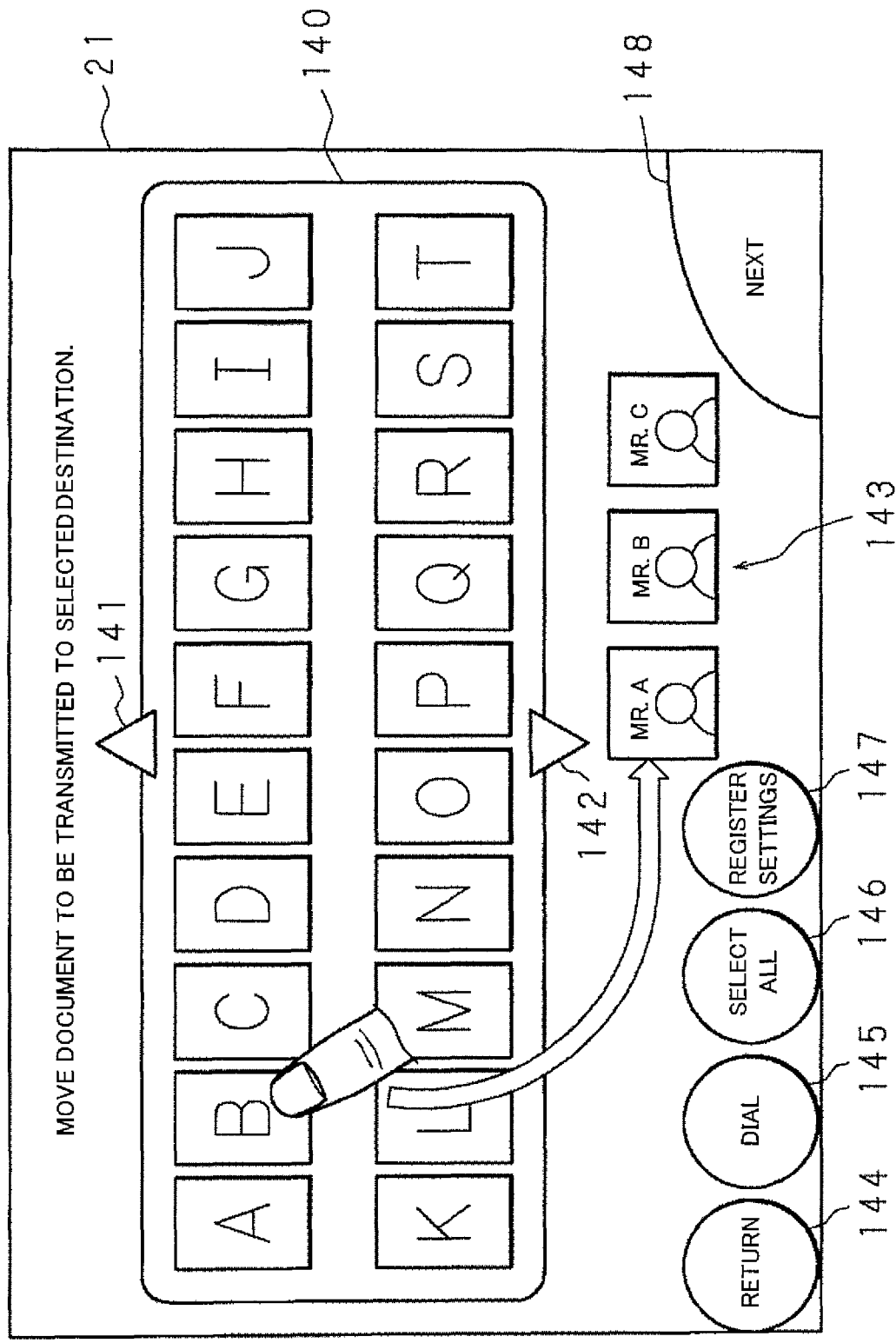
FIG. 13 is a diagram for explaining the operating procedure of the touch panel of the digital MFP according to the present invention.
Figure 14:
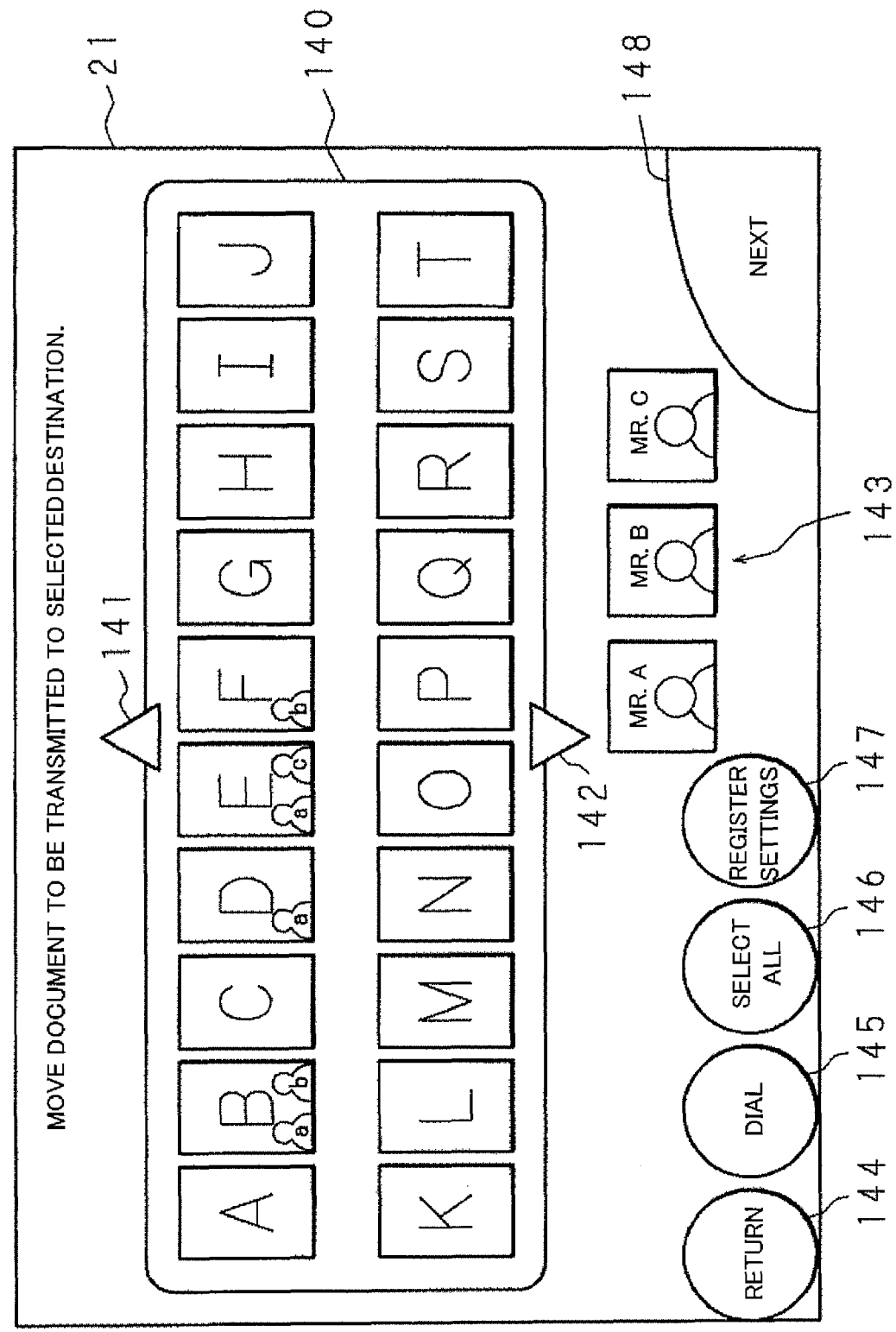
FIG. 14 is a diagram for explaining the operating procedure of the touch panel of the digital MFP according to the present invention.

A destination icon display area 143 is provided in the lower portion of the list display area 140, and the digital MFP 1 displays the destination icons selected in the destination icon list display area 120 illustrated in FIG. 11 in the destination icon display area 143. In the example of FIG. 12, the three destination icons highlighted in FIG. 11 are displayed in the destination icon display area 143. For example, as illustrated in FIG. 13, by dragging one of the scanned images (B) and dropping the image on one of the destination icons, the destinations of the scanned images are set individually. The digital MFP 1 displays reduced or simplified destination icons overlapped on the scanned images in the list display area 140 when the destinations are set individually (see FIG. 14), so that the user can confirm the destinations of the respective scanned image by the overlapped destination icons.

Displayed below the destination icon display area 143 are an icon 144 for returning the display 21 back to the previous display, a dial icon 145 for setting the destination by inputting the facsimile number directly, a select all icon 146 for selecting all scanned images displayed in the destination icon list display area 140, a setting registration icon 147 for displaying a menu for registering new destinations, and an icon 148 for finally fixing the selection of the destination of the respective scanned images and moving to the next step. When the icon 148 indicated as NEXT is touched, the digital MFP 1 transmits the scanned images to the preset destinations.

As described above, with the digital MPP 1 according to the present invention, the user drags the scanned images displayed in the list display area 140 and drops them to the destination icons displayed in the destination icon display area 143. Accordingly, the destinations of the respective scanned images are set individually with ease, and the operability and convenience of the digital MFP 1 is thereby improved. The setting of destinations of e-mails is achieved in the same manner as in facsimile transmission described above, when the icon 34 is touched in FIG. 2(a), and a function to transmit the scanned image via e-mail is selected.

Figure 15:
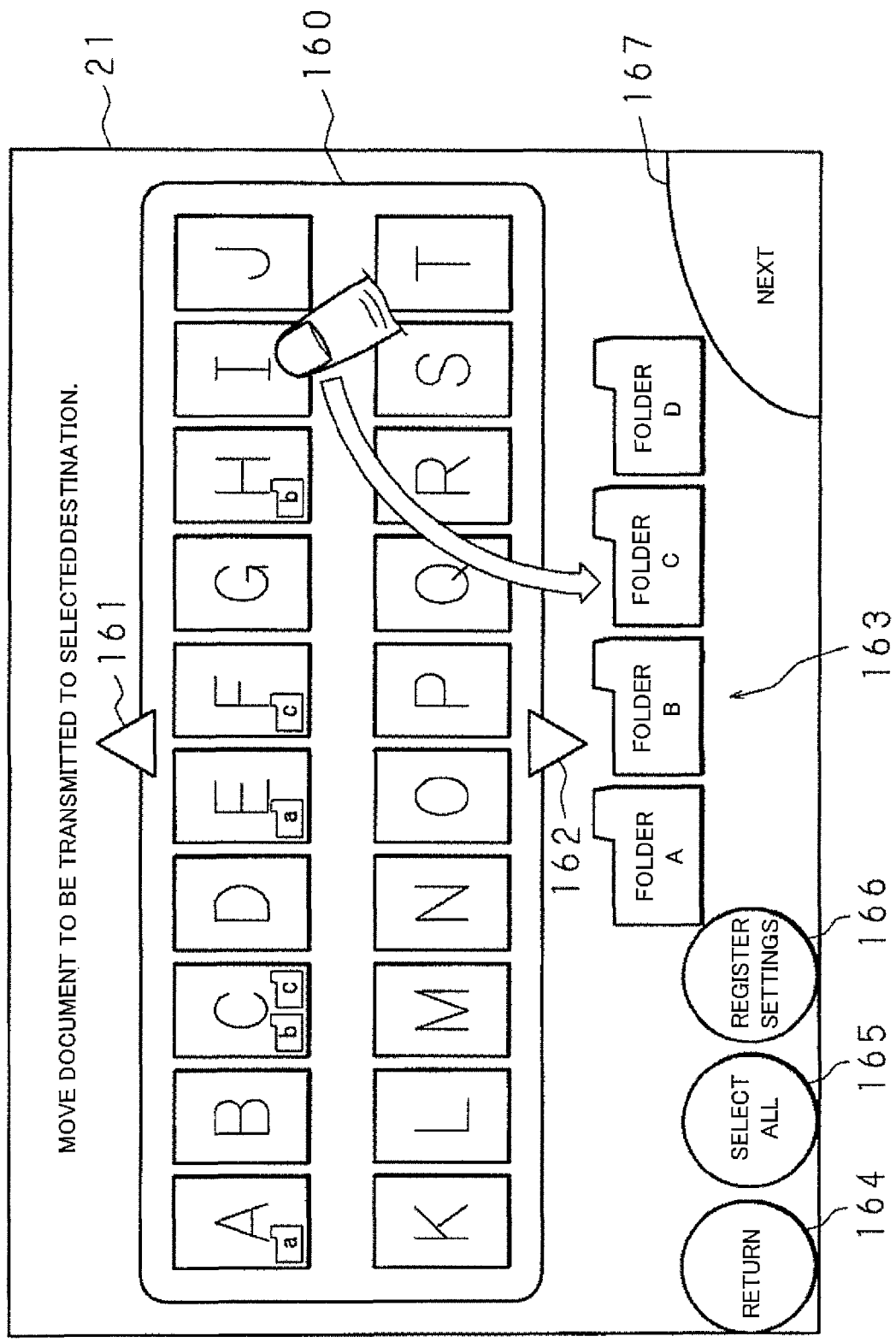
FIG. 15 is a diagram for explaining the operating procedure of the touch panel of the digital MFP according to the present invention.

Operation of the digital MFP 1 in the scanner mode will be described. FIG. 15 explains the operating procedure of the touch panel 19 of the digital MFP 1 according to the present invention. The digital MFP 1 according to this embodiment communicates with the PCs 5, 6, 7, . . . via the LAN. With this communication, the digital MFP I stores the scanned images of the document scanned by the scanner function in the folders of the PCs 5, 6, 71 . . . registered in advance. The user touches the icon 32 in FIG. 2(a) to start scanning of the document. When scanning is completed, the digital MFP 1 displays a menu for selecting at least one folder as a location to save from the registered plurality of folders. Then, the digital MFP 1 accepts a touch operation to the displayed menu and accepts the selection of the location to save by the user.

After accepting the selection of the location to save, the digital MFP 1 displays the list of the scanned images of the documents scanned by the document scanner 16 (See FIG. 15). At this time, the digital MFP 1 tiles the scanned images acquired by the document scanner 16 in the form of a list in a list display area 160 defined by the square frame displayed from the center to the upper portion of the display 21. When the user touches an upward scroll icon 161 and a downward scroll icon 162 provided at upper and lower portions of the list display area 160, the display of the scanned images in the list display area 160 is scrolled upward and downward.

A location-to-save icon display area 163 is provided in the lower portion of the list display area 160. The digital MFP 1 displays the location-to-save icon relating to the location to save that is selected and accepted in the location-to-save icon display area 163. The location-to-save icon includes a character string indicating the folder name as the location to save combined with a rough image of a folder. In the example of FIG. 15, the location-to-save icons showing four folders a-d are displayed in the location-to-save icon display area 163. For example, by dragging one of the scanned images (I) and dropping the scanned image I on one of the location-to-save icons (folder C), the location to save scanned image I is set individually as folder C. The digital MFP 1 displays reduced or simplified location-to-save icons overlapped on the respective scanned images in the list display area 160 when the locations to save are set individually. Therefore the user can confirm the location to save the respective scanned images by the overlapped location-to-save icons.

Displayed below the location-to-save icon display area 163 are an icon 164 for returning the display on the display 21 back to the previous display, a select all icon 165 for selecting all scanned images displayed in the destination icon list display area 160, a setting registration icon 166 for displaying the menu for registering a new location to save, and an icon 167 for finally fixing the locations to save for the respective scanned images and moving to the next step. When the icon 167 indicated as NEXT is touched, the digital MFP 1 saves the respective scanned images to the preset locations to save.

As described above, with the digital MFP 1 according to the present invention, the user drags scanned images displayed in the list display area 160 and drops the scanned images to the destination icons displayed in the location-to-save icon display area 163. With the drag & drop operation, the locations to save for the transmitted images are set individually with ease, and the operability and the convenience of the digital MFP 1 are thereby improved. The digital MFP 1 may be provided with a function to mount an external storage medium such as a USB memory or a card-type memory in addition to the function to store the scanned images in the folders of the PCs 5, 6, 7, . . . connected via the LAN. In this case, the location-to-save icon relating to the folder in the external storage medium is displayed and the scanned images are saved in the folder in the external storage medium by the drag & drop operation.

Figure 16:
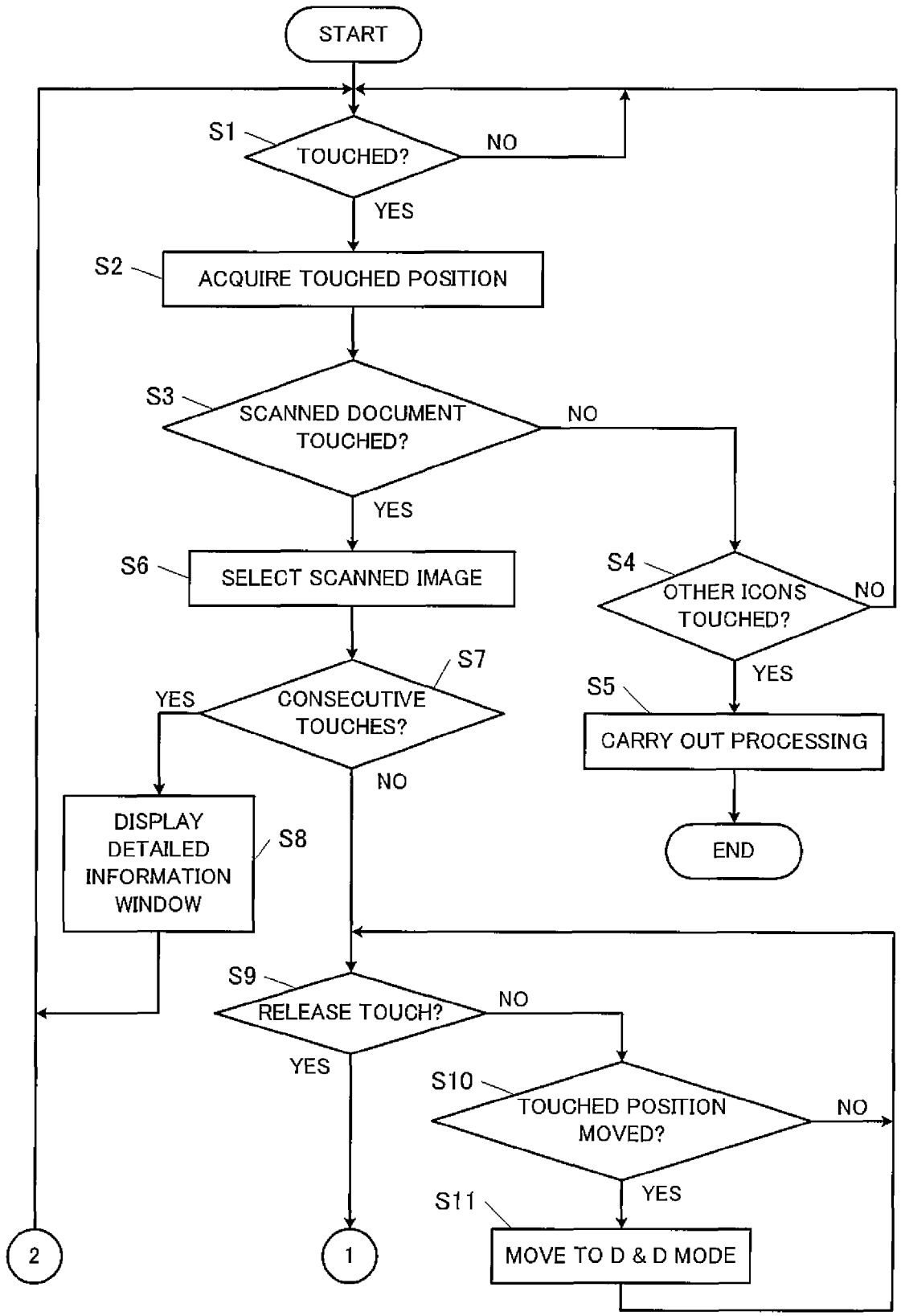
FIG. 16 is a flowchart of an operation acceptance procedure of the touch panel carried out by the digital MFP according to the present invention.
Figure 17:
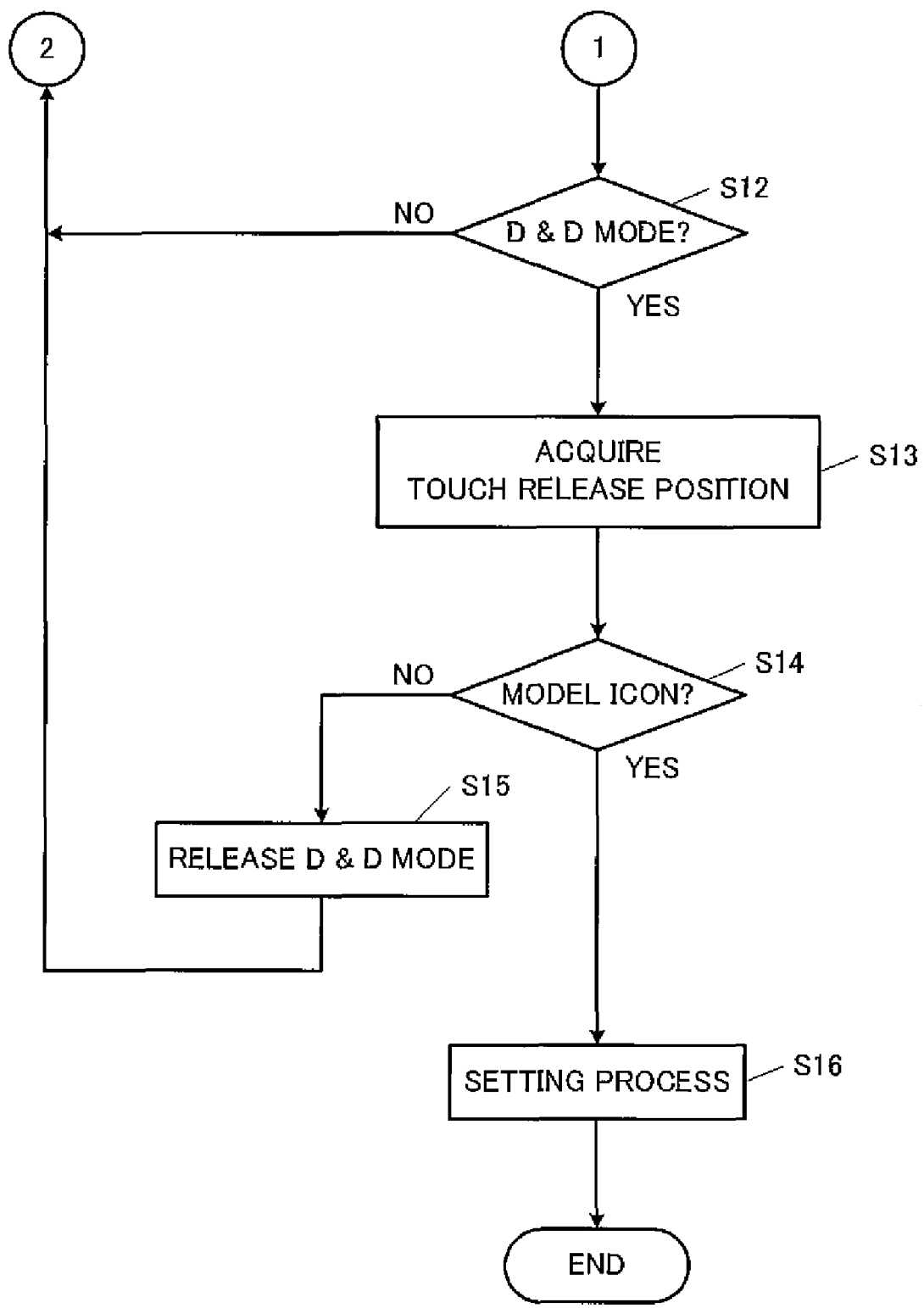
FIG. 17 is a flowchart of the operation acceptance procedure of the touch panel carried out by the digital MFP according to the present invention.

FIG. 16 and 17 are flowcharts of a procedure for accepting the operation in the touch panel 19 carried out by the controller 10 of the digital MFP 1 according to the present invention. A procedure for the process illustrated in FIGS. 5-7 (in the case of an aggregated copy) is illustrated as an example. The controller 10 of the digital MFP 1 inspects whether or not the touch sensor 22 of the touch panel 19 senses a touch to the display 21 (Step S1). If not (S1: No), the controller 10 waits until a touch to the display 21 by the user is sensed.

When a touch to the display 21 is sensed (S1: Yes), the controller 10 acquires the touched position on the display 21 by the touch sensor 22 (Step S2), and inspects whether or not it is a touch to a scanned image displayed on the display 21 (Step S3). If a scanned image is not touched (S3: No), the controller 10 then inspects whether or not the contact is to other icons (Step S4). When it is the touch to other icons (S4: Yes), the controller 10 carries out processes allocated to the touched icon (Step S5), and then ends the process. The flow in the drawings is repeated, and hence the controller 10 starts the illustrated flow again after having terminated the process in Step S5 and ended the operation accepting process, and carries out the process in Step S1.

When a scanned image is touched (S3: Yes), the controller 10 selects and highlights the touched scanned image (Step S6), and then determines whether or not the touch to the scanned image is a consecutive touch operation (Step S7). This is determined based on whether or not the time period from the previous touch to the current touch is within a predetermined time period using a timer or the like provided in the controller 10. When the scanned image is consecutively touched (S7: Yes), the controller 10 displays the detailed information window 100 on the display 21 (Step S8) and goes back to Step S1.

When the scanned image is not consecutively touched (S7: No)., the touch sensor 22 checks whether or not the touch to the display 21 is released (Step S9). When the touch is not released (S9: No), the touch sensor 22 checks whether or not the touched position to the display 21 is moved (Step S10) When the touch position is moved (S10: Yes), the controller 10 is transferred to the drag & drop mode (hereinafter referred to as D&D mode) for accepting the drag & drop operation (Step S11), and goes back to Step S9. When the touch position is not moved (S10: No), the procedure goes back to Step S9.

When the touch to the display 21 is released in Step S9 (S9: Yes), the controller 10 checks whether or not the current state is in the D&D mode (Step S12). When it is not in the D&D mode (S12: No), the procedure goes back to Step S11 and repeats the above process. When it is in the D&D mode (S12: Yes), the touch sensor 22 acquires the position where the touch to the display 21 is released (that is, the position where the user released his/her finger) (Step S13). Then, the controller 10 checks whether or not the acquired touch-released position is on the model icon 73 (Step S14), and if it is not on the model icon 73 (S14: No), the D&D mode is released (Step S15) and the controller 10 goes back to the Step S1, and repeats the process described above. When the touch-released position is on the model icon 73 (S14; Yes), the controller 10 carries out the aggregation setting process for allocating the scanned images to the divided areas of the model icon 73 (Step S16), and ends the process. The flow in the drawings is repeated, and hence the controller 10 restarts the flow after having terminated the process in Step S16 and ended the operation accepting process, and carries out the process in Step S1.

The digital MFP 1 according to the present invention configured as described above displays scanned images acquired by scanning with the document scanner 16, and icons such as the model icon 73, the destination icons or the location-to-save icons on the display 21 of the touch panel 19, and accepts the scanned images as objects to be processed by the dragging operation, and accepts the process for the scanned images by the dropping operation with respect to the icons. Since the user carries out various processes by a drag & drop operation on a single display, operability and convenience of the digital MFP 1 are improved.

In this embodiment, the case of setting the aggregated copy for the copying function, the case of setting the destinations for the facsimile function, and the case of setting the location to save for the scanner function in the digital MFP 1 have been described. However, the present invention is not limited thereto and may be applied to other operations. The examples of display 21 illustrated in FIGS. 2-15 are illustrative only, and hence the present invention is not limited thereto, and the arrangement and the design of the icons and layout may be modified as needed. Although a digital MFP has been described as an example of a document scanning apparatus, the present invention is not limited thereto and encompasses devices specific for functions such as copying machines, facsimile machines, and scanners.

While the present invention has been described with respect to embodiments thereof, it will be apparent to those skilled in the art that the invention may be modified in numerous ways and may assume many embodiments other than those specifically set out and described above. Accordingly, the appended claims cover all modifications that fall within the true spirit and scope of the present invention.

What is claimed is:

1. A document scanning apparatus comprising:
   a document scanner that scans at least one page of a document and acquires a scanned image for each page;
   a touch-panel including a display that displays an image and a sensor that senses a touch operation to the displayed image;
   a display processing unit that displays at least one scanned image and an image to be processed associated with a process to be carried out for the scanned image on the display;
   an object-to-be-processed accepting unit that accepts the scanned image as an object to be processed when the sensor senses the touch operation to the scanned image displayed on the display;
   a process accepting unit that accepts a process associated with the image to be processed as a process to be carried out for the object to be processed when the sensor senses the touch operation to the image to be processed displayed on the display after the object-to-be-processed accepting unit has accepted the object to be processed; and
   a scanned image processing unit that carries out the process accepted by the process accepting unit for the scanned image to be processed that is accepted by the object-to-be-processed accepting unit, wherein
   the display processing unit displays a processed result carried out by the scanned image processing unit on the display together with the scanned image or the image to be processed,
   the display processing unit displays as the image to be processed a model image associated with an editing process to be carried out for the scanned image,
   the scanned image processing unit carries out the editing process on the basis of the model image accepted by the process accepting unit for the scanned image to be processed accepted by the object-to-be-processed accepting unit, and
   the display processing unit displays the result of combining the scanned image to be processed with the model image.

2. The document scanning apparatus according to claim 1, wherein the object to be processed and the process to be carried out are selected by touching the scanned image, and dragging and dropping the scanned image on the image to be processed.

3. The document scanning apparatus according to claim 1, wherein the object to be processed and the process to be carried out are selected by alternately touching the scanned image and the image to be processed.

4. The document scanning apparatus according to claim 1, wherein the model image is a frame divided into parts for an aggregating function, and the scanned images and parts of the divided frame are selected in correspondence.

5. The document scanning apparatus according to claim 1, wherein the model image comprises frames allocated to a front face and a back face of printing paper for a duplex printing function, and the scanned image and frames are selected in correspondence to permit allocation of scanned images to the front and back faces.

6. The document scanning apparatus according to claim 1, further comprising a transmitter that transmits the scanned image to another apparatus provided separately,
   wherein the display processing unit displays a destination image associated with a destination to be transmitted by the transmitter as the image to be processed on the display, and the scanned image processing unit transmits the scanned image to be processed which is accepted by the object-to-be-processed accepting unit to the destination allocated to the destination image accepted by the process accepting unit.

7. The document scanning apparatus according to claim 6, wherein a plurality of icons having appellations of destinations are displayed and a destination icon is selected for the respective scanned images for transmission.

8. The document scanning apparatus according to claim 7, wherein a processed result is displayed by overlapping the appellation of the specified destination on the corresponding scanned image.

9. The document scanning apparatus according to claim 1, further comprising:
   a saving processing unit that saves the scanned image in a storage device,
   wherein the display processing unit displays a location-to-save icon associated with a location to save by the saving processing unit as the image to be processed, and the scanned image processing unit saves the scanned image to be processed which is accepted by the object-to-be-processed accepting unit in the location to save allocated to the location-to-save image that is accepted by the process accepting unit.

10. The document scanning apparatus according to claim 1, wherein a plurality of icons having a storage device name or a folder name as the location to save shown thereon are tiled so that the icons of the location to save are selected for the scanned images for saving.

11. The document scanning apparatus according to claim 10, wherein the processed result is displayed by overlapping the storage device name or the folder name specified as the location to save on the corresponding scanned image.

12. The document scanning apparatus according to claim 1, wherein the display processing unit displays information on the scanned image when a consecutive touch operation to the scanned image displayed on the display is sensed.

13. The document scanning apparatus according to claim 12, wherein the detailed information comprises image quality, density, size or magnification.

14. A digital multifunction peripheral comprising the document scanning apparatus of claim 1.

15. A document scanning method comprising:
   scanning a document and acquiring a scanned image;
   displaying the scanned image and accepting the scanned image as an object to be processed when the displayed scanned image is touched;
   displaying an image associated with a process to be carried out on the scanned image and accepting the process to be carried out when the image associated with the process to be carried out is touched;
   carrying out the process on the scanned image;
   displaying a result of the process carried out;
   displaying a model image associated with an editing process as the image associated with the process to be carried out;
   carrying out an editing process on the basis of an accepted model image and an accepted scanned image; and
   displaying a result of combining the scanned image with the model image.

16. The document scanning method according to claim 15, further comprising:
   displaying a destination image associated with a transmission destination as the image associated with the process to be carried out; and
   transmitting an accepted scanned image to an accepted destination image.

17. The document scanning method according to claim 15, further comprising:
   saving the scanned image in a storage device;
   displaying a location-to-save icon as the image associated with the process to be carried out; and
   saving an accepted scanned image to a location to save associated with an accepted location-to-save icon.

18. The document scanning method according to claim 15, further comprising:
   displaying information on the scanned image when the scanned image is consecutively touched.

* * * * *